United States Patent
Wang et al.

(10) Patent No.: US 12,550,030 B2
(45) Date of Patent: Feb. 10, 2026

(54) GATEWAY STATION SWITCHING METHOD AND APPARATUS

(71) Applicant: HUAWEI TECHNOLOGIES CO., LTD., Shenzhen (CN)

(72) Inventors: Xiaolu Wang, Hangzhou (CN); Hejia Luo, Hangzhou (CN); Yu Wang, Hangzhou (CN); Ying Chen, Hangzhou (CN); Xueliang Shi, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 675 days.

(21) Appl. No.: 17/898,952

(22) Filed: Aug. 30, 2022

(65) Prior Publication Data

US 2022/0417817 A1 Dec. 29, 2022

Related U.S. Application Data

(63) Continuation of application No. PCT/CN2021/074849, filed on Feb. 2, 2021.

(30) Foreign Application Priority Data

Mar. 3, 2020 (CN) .......................... 202010140332.5

(51) Int. Cl.
*H04B 7/185* (2006.01)
*H04W 36/30* (2009.01)

(52) U.S. Cl.
CPC ................................. *H04W 36/302* (2023.05)

(58) Field of Classification Search
CPC ... H04W 36/302; H04W 36/12; H04W 36/18; H04W 36/0058; H04W 84/06

(Continued)

(56) References Cited

U.S. PATENT DOCUMENTS

| | | | |
|---|---|---|---|
| 6,052,587 A | * | 4/2000 | Moraes ............. H04B 7/18539 455/430 |
| 6,115,606 A | * | 9/2000 | Munoz-Garcia ... H04B 7/18545 455/12.1 |

(Continued)

FOREIGN PATENT DOCUMENTS

| | | |
|---|---|---|
| CN | 110429975 A | 11/2019 |
| CN | 110445528 A | 11/2019 |

(Continued)

OTHER PUBLICATIONS

CATT, "Feeder Link Switch", 3GPP TSG-RAN WG2 Meeting #108, R2-1914494, XP051816564, Nov. 18-22, 2019, 8 pages.

(Continued)

*Primary Examiner* — Amancio Gonzalez
(74) *Attorney, Agent, or Firm* — Maier & Maier, PLLC

(57) ABSTRACT

A gateway station switching method and apparatus. When quality of a link from a terminal device to a source gateway station through a satellite is poor, the source gateway station sends third indication information to a target gateway station, so that the target gateway station feeds back second channel quality to the source gateway station, that is, quality of a link from the terminal device to the target gateway station through the satellite. The source gateway station determines, based on the second channel quality and first channel quality that represents the quality of the link from the terminal device to the source gateway station through the satellite, whether to switch the terminal device to the target gateway station.

14 Claims, 8 Drawing Sheets

(58) Field of Classification Search
USPC .......................................................... 370/316
See application file for complete search history.

(56) References Cited

U.S. PATENT DOCUMENTS

| | | | | |
|---|---|---|---|---|
| 6,208,836 | B1* | 3/2001 | Albuquerque Moraes | H04B 7/18534 455/430 |
| 6,314,290 | B1* | 11/2001 | Joshi | H04B 7/18558 455/433 |
| 6,625,450 | B1* | 9/2003 | Munoz-Garcia | H04B 7/18539 455/430 |
| 7,869,759 | B2* | 1/2011 | Pateros | H04B 7/18515 455/12.1 |
| 8,311,491 | B2* | 11/2012 | Miller | H04W 28/0236 370/328 |
| 8,588,086 | B2* | 11/2013 | Tian | H04L 1/0025 370/252 |
| 8,989,125 | B1* | 3/2015 | Marupaduga | H04B 7/024 455/67.11 |
| 9,461,765 | B2* | 10/2016 | Eroz | H04L 1/0041 |
| 9,473,578 | B2* | 10/2016 | Gopal | H04B 7/2041 |
| 9,554,309 | B2* | 1/2017 | Park | H04W 24/10 |
| 10,116,377 | B2* | 10/2018 | Lohman | H04B 7/185 |
| 10,143,002 | B2* | 11/2018 | Madan | H04W 72/542 |
| 10,320,472 | B2* | 6/2019 | O'Neill | H04W 72/121 |
| 10,420,134 | B2* | 9/2019 | Bendle | H04W 72/23 |
| 10,742,475 | B2* | 8/2020 | Lai | H04L 25/0224 |
| 10,958,755 | B2* | 3/2021 | Chou | H04L 12/66 |
| 11,102,700 | B2* | 8/2021 | Lei | H04W 40/248 |
| 11,140,609 | B2* | 10/2021 | Martin | H04W 8/005 |
| 11,218,214 | B2* | 1/2022 | Schmidt | H04W 36/0085 |
| 11,228,984 | B2* | 1/2022 | Harrison | H04B 7/0465 |
| 11,290,206 | B2* | 3/2022 | Xu | H04B 7/0632 |
| 11,356,171 | B2* | 6/2022 | Xu | H04B 7/18519 |
| 11,477,804 | B2* | 10/2022 | Duet | H04W 72/542 |
| 11,516,765 | B2* | 11/2022 | Agarwal | H04L 5/0048 |
| 11,689,280 | B2* | 6/2023 | Mahalingam | H04B 17/309 455/12.1 |
| 11,736,997 | B2* | 8/2023 | Yang | H04W 76/15 370/331 |
| 11,902,783 | B2* | 2/2024 | Salkintzis | H04L 63/166 |
| 11,903,051 | B2* | 2/2024 | Masini | H04W 76/12 |
| 11,943,706 | B2* | 3/2024 | Sedin | H04B 7/18513 |
| 11,956,038 | B2* | 4/2024 | Shreevastav | H04W 64/00 |
| 11,985,618 | B2* | 5/2024 | Narasimha | H04W 74/0833 |
| 12,022,342 | B2* | 6/2024 | Liberg | G01S 5/14 |
| 12,066,557 | B2* | 8/2024 | Liberg | H04B 7/18504 |
| 12,074,684 | B2* | 8/2024 | Dankberg | H01Q 1/288 |
| 12,096,290 | B2* | 9/2024 | Sedin | H04W 36/00837 |
| 12,133,066 | B2* | 10/2024 | Lu | H04W 36/005 |
| 12,192,937 | B2* | 1/2025 | Mahalingam | H04W 56/0005 |
| 12,225,393 | B2* | 2/2025 | Zhou | H04L 1/203 |
| 12,231,974 | B2* | 2/2025 | Deenoo | H04B 7/18513 |
| 12,232,114 | B2* | 2/2025 | Shi | H04W 72/20 |
| 12,238,783 | B2* | 2/2025 | Narasimha | H04W 72/0446 |
| 2004/0066347 | A1* | 4/2004 | Schiff | H04B 7/18513 343/786 |
| 2006/0217851 | A1 | 9/2006 | McGuffin et al. | |
| 2009/0028324 | A1* | 1/2009 | Eroz | H03M 13/2957 380/28 |
| 2016/0057672 | A1* | 2/2016 | Park | H04L 1/1812 370/331 |
| 2016/0197686 | A1* | 7/2016 | Rozmaryn | H04B 7/1851 370/252 |
| 2021/0258105 | A1* | 8/2021 | Shrestha | H04L 1/1887 |
| 2022/0110181 | A1* | 4/2022 | Miao | H04L 5/0023 |
| 2022/0272760 | A1* | 8/2022 | Murray | H04W 74/0836 |
| 2022/0346157 | A1* | 10/2022 | Wang | H04W 74/0836 |
| 2022/0386204 | A1* | 12/2022 | Parichehrehteroujeni | H04W 36/18 |
| 2023/0017009 | A1* | 1/2023 | Mohamed | H04W 36/0022 |
| 2023/0076306 | A1* | 3/2023 | Gunnarsson | H04B 7/024 |
| 2023/0319578 | A1* | 10/2023 | Farag | H04W 74/08 370/330 |
| 2024/0098588 | A1* | 3/2024 | Da Silva | H04W 24/10 |

FOREIGN PATENT DOCUMENTS

| | | |
|---|---|---|
| CN | 110536477 A | 12/2019 |
| CN | 110582094 A | 12/2019 |
| CN | 111786710 A | 10/2020 |
| WO | 2014001837 A1 | 1/2014 |

OTHER PUBLICATIONS

Ericsson, "On physical layer control procedures for NTN", 3GPP TSG-RAN WG1 Meeting #98bis, R1-1910981, Chongqing, China, Oct. 14-20, 2019, 9 pages.

* cited by examiner

GATEWAY STATION SWITCHING METHOD AND APPARATUS

CROSS-REFERENCE TO RELATED APPLICATIONS

This application is a continuation of International Application No. PCT/CN2021/074849, filed on Feb. 2, 2021, which claims priority to Chinese Patent Application No. 202010140332.5, filed on Mar. 3, 2020. The disclosures of the aforementioned applications are hereby incorporated by reference in their entireties.

TECHNICAL FIELD

The embodiments relate to the field of satellite communication technologies, a gateway station switching method, and an apparatus.

BACKGROUND

A non-terrestrial network (NTN) is introduced into the fifth-generation mobile communication (5G) technology, and a base station or some functions of the base station are deployed on a high-altitude platform or a satellite, to provide coverage for user equipment (UE), such as a terminal device. This features large coverage and flexible networking.

In NTN communication, a link between a terminal device and a gateway station includes two parts: a service link between the terminal device and a satellite, and a feeder link between the satellite and the gateway station. A main function of the satellite includes transparent transmission and the like. Therefore, if a quality problem occurs on an entire link between the terminal device and the gateway station, quality of the service link may be poor, quality of the feeder link may be poor, or quality of both the service link and the feeder link may be poor. When the feeder link is faulty, a common solution is to switch the gateway station.

In a conventional link quality detection method of a terrestrial network, the terminal device sends an uplink reference signal to a base station, and the base station determines quality of a link between the terminal device and the base station based on quality of the uplink reference signal. It is clearly that if the conventional link quality detection method is reused in NTN communication, when the gateway station determines that quality of a link from the terminal device to the gateway station through a satellite is poor, the gateway station cannot further determine whether the quality of the feeder link or the quality of the service link is poor, and cannot determine whether the gateway station needs to be switched. As a result, communication quality is poor.

SUMMARY

The embodiments may provide a gateway station switching method and an apparatus, to determine whether to switch a gateway station by comparing quality of a link from a source gateway station to a terminal device through a satellite and quality of a link from a target gateway station to the terminal device through the satellite, thereby improving communication quality.

According to a first aspect, an embodiment may provide a gateway station switching method. The method may be applied to a terminal device or may be applied to a chip in a terminal device. The following describes the method by using an example in which the method is applied to a terminal device. The method includes the following steps. If a terminal device detects that quality of a downlink signal that is from a source gateway station and that is forwarded by a satellite is lower than a first threshold, the terminal device sends first indication information to the source gateway station. The first indication information indicates that first channel quality is lower than the first threshold. The first channel quality represents quality of a link from the terminal device to the source gateway station through the satellite. According to this solution, the terminal device triggers gateway station switching.

After sending the first indication information to the source gateway station, the terminal device may further send an uplink reference signal to the satellite. The uplink reference signal is used by the source gateway station to detect the first channel quality and used by a target gateway station to detect second channel quality. The second channel quality represents quality of a link from the terminal device to the target gateway station through the satellite. According to this solution, the uplink reference signal is sent to the satellite, and the satellite forwards the uplink reference signal to the corresponding gateway station, so that the gateway station determines the channel quality.

The first indication information may be an uplink reference signal. The uplink reference signal is used by the source gateway station to detect the first channel quality and used by a target gateway station to detect second channel quality. The second channel quality represents quality of a link from the terminal device to the target gateway station through the satellite. According to this solution, the terminal device does not need to send the uplink reference signal after sending the first indication information, thereby reducing a quantity of times that the terminal device sends the signal.

Before detecting that the quality of the downlink signal that is from the source gateway station and that is forwarded by the satellite is lower than the first threshold, the terminal device may further receive at least one of the first threshold, an activation instruction, a target quantity N of times, and an interval T that are from the source gateway station and forwarded by the satellite. The activation instruction instructs the terminal device to send the uplink reference signal when the quality of the downlink signal is lower than the first threshold. The target quantity N of times indicates a quantity of times that the terminal device sends the uplink reference signal. The interval T indicates duration from sending the uplink reference signal by the terminal device for N times to detecting the quality of the downlink signal again, where N is an integer greater than or equal to 1. According to this solution, the source gateway station controls whether the terminal device enables a gateway station function.

At least one of the first threshold, the activation instruction, the target quantity N of times, and the interval T may be carried in broadcast information. Alternatively, at least one of the first threshold, the activation instruction, the target quantity N, and the interval T is carried in connected mode information, where the connected mode information includes at least one of RRC information, downlink control information DCI, group DCI, a media access control MAC element, and a timing advance command TAC. Alternatively, at least one of the first threshold, the activation instruction, the target quantity N of times, and the interval T is sent through a physical downlink shared data channel. According to this method, the activation instruction, the target quantity N of times, or the interval T is flexibly sent.

The method may further include: the terminal device receives second indication information sent by the source gateway station through the satellite, where the second indication information indicates a transmission resource of the uplink reference signal. According to this solution, the transmission resource is flexibly configured for the terminal device.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords. According to this solution, the source gateway station identifies uplink reference signals sent by different terminal devices.

According to a second aspect, an embodiment may provide a gateway station switching method. The method may be applied to a source gateway station or may be applied to a chip in a source gateway station. The following describes the method by using an example in which the method is applied to the source gateway station, and the method includes: When quality of a link from a terminal device to the source gateway station through the satellite is poor, the source gateway station sends third indication information to a target gateway station, so that the target gateway station feeds back second channel quality to the source gateway station, that is, quality of a link from the terminal device to the target gateway station through the satellite. The source gateway station determines, based on the second channel quality and first channel quality that represents the quality of the link from the terminal device to the source gateway station through the satellite, whether to switch the terminal device to the target gateway station. According to this solution, the source gateway station determines whether to switch the gateway station by comparing the quality of the link from the source gateway station to the terminal device through the satellite and the quality of the link from the target gateway station to the terminal device through the satellite, thereby improving communication quality.

Before sending the third indication information to the target gateway station, the source gateway station may further determine that the first channel quality is lower than a first threshold. According to this solution, the source gateway station actively triggers gateway station switching.

Before sending the third indication information to the target gateway station, the source gateway station may further receive first indication information that is from the terminal device and that is forwarded by the satellite, where the first indication information indicates that channel quality of the link from the terminal device to the source gateway station through the satellite is lower than a first threshold. According to this solution, the terminal device actively triggers gateway station switching.

When the first indication information is an uplink reference signal of a preset structure, the uplink reference signal may be further used by the source gateway station to detect the first channel quality and the target gateway station to detect the second channel quality. According to this solution, the terminal device does not need to send the uplink reference signal after sending the first indication information, thereby reducing a quantity of times that the terminal device sends the signal.

Before receiving the first indication information that is from the terminal device and that is forwarded by the satellite, the source gateway station may further send at least one of a first threshold, an activation instruction, a target quantity N of times, and an interval T to the terminal device through the satellite. The activation instruction instructs the terminal device to send the uplink reference signal when the quality of the downlink signal is lower than the first threshold. The target quantity N of times indicates a quantity of times that the terminal device sends the uplink reference signal. The interval T indicates duration from sending the uplink reference signal by the terminal device for N times to detecting the quality of the downlink signal again, where N is an integer greater than or equal to 1. According to this solution, the source gateway station controls whether the terminal device enables a gateway station function.

At least one of the first threshold, the activation instruction, the target quantity N of times, and the interval T may be carried in broadcast information. Alternatively, at least one of the first threshold, the activation instruction, the target quantity N, and the interval T is carried in connected mode information, where the connected mode information includes at least one of RRC information, downlink control information DCI, group DCI, a media access control MAC element, and a timing advance command TAC. Alternatively, at least one of the first threshold, the activation instruction, the target quantity N of times, and the interval T is sent through a physical downlink shared data channel. According to this method, the activation instruction, the target quantity N of times, or the interval T is flexibly sent.

In a process in which the source gateway station determines, based on the second channel quality and the first channel quality, whether to switch the terminal device to the target gateway station, the source gateway station may switch the terminal device from the source gateway station to the target gateway station when the first channel quality is lower than a second threshold and the second channel quality is higher than or equal to the second threshold; or the source gateway station switches each terminal device in a target area from the source gateway station to the target gateway station when the first channel quality is lower than a second threshold and the second channel quality is higher than or equal to the second threshold. The target area is a cell or a beam coverage area in which the terminal device is located. The cell includes at least one beam coverage area. The cell is included in a coverage area of the satellite. This solution implements gateway station switching at a terminal device level, a cell level, or a beam coverage area level.

The method may further include: the source gateway station performs satellite switching on the terminal device when the first channel quality is lower than a second threshold and the second channel quality is lower than the second threshold; or the source gateway station performs satellite switching on each terminal device in a target area when the first channel quality is lower than a second threshold and the second channel quality is lower than the second threshold. The target area is a cell or a beam coverage area in which the terminal device is located. The cell includes at least one beam coverage area. The cell is included in a coverage area of the satellite. This solution implements satellite switching at a terminal device level, a cell level, or a beam coverage area level.

Before receiving the second channel quality from the target gateway station, the source gateway station may further send the second indication information to the terminal device through the satellite, where the second indication information indicates a transmission resource for transmitting the uplink reference signal, and the uplink reference signal is used to detect the first channel quality. According to this solution, the source gateway station flexibly configures the transmission resource for the terminal device.

The third indication information may further indicate a transmission resource on which the uplink reference signal is located, and the uplink reference signal is used to detect the first channel quality. According to this solution, the source gateway station indicates the transmission resource of the uplink reference signal to the target gateway station.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords. According to this solution, the source gateway station identifies uplink reference signals sent by different terminal devices.

The method may further include: the source gateway station sends fourth indication information to the satellite, where the fourth indication information indicates the satellite to send the uplink reference signal to the source gateway station and the target gateway station. According to this solution, the source gateway station triggers the satellite to forward the signal from the terminal device to a plurality of gateway stations.

According to a third aspect, an embodiment may provide a gateway station switching method. The method may be applied to a target gateway station or may be applied to a chip in a target gateway station. The following describes the method by using an example in which the method is applied to the target gateway station, and the method includes: The target gateway station receives third indication information sent by a source gateway station, where the third indication information indicates the target gateway station to feed back second channel quality to the source gateway station. The second channel quality represents quality of a link from a terminal device to the target gateway station through a satellite. Then, the target gateway station determines the second channel quality, and sends the second channel quality to the source gateway station. According to this solution, the target gateway station feeds back the second channel quality to the source gateway station.

When the target gateway station determines the second channel quality, the target gateway station may receive an uplink reference signal that is from the terminal device and that is forwarded by the satellite and may determine the second channel quality based on the uplink reference signal. According to this solution, the target gateway station determines the second channel quality.

The third indication information may further indicate a transmission resource on which the uplink reference signal is located, and the uplink reference signal may be used to detect the first channel quality. According to this solution, the source gateway station indicates the transmission resource of the uplink reference signal to the target gateway station.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords. According to this solution, the target gateway station identifies uplink reference signals sent by different terminal devices.

According to a fourth aspect, an embodiment may provide a communication apparatus, including:
a processing unit, configured to detect that quality of a downlink signal that is from a source gateway station and that is forwarded by a satellite is lower than a first threshold; and
a transceiver unit, configured to send first indication information to the source gateway station, where the first indication information indicates that first channel quality is lower than the first threshold, and the first channel quality represents quality of a link from a terminal device to the source gateway station through the satellite.

After sending the first indication information to the source gateway station, the transceiver unit may be further configured to send an uplink reference signal to the satellite. The uplink reference signal is used by the source gateway station to detect the first channel quality and used by a target gateway station to detect second channel quality. The second channel quality represents quality of a link from the terminal device to the target gateway station through the satellite.

The first indication information may be an uplink reference signal. The uplink reference signal is used by the source gateway station to detect the first channel quality and used by a target gateway station to detect second channel quality. The second channel quality represents quality of a link from the terminal device to the target gateway station through the satellite.

Before the processing unit detects that the quality of the downlink signal that is from the source gateway station and that is forwarded by the satellite is lower than the first threshold, the transceiver unit may be further configured to receive at least one of the first threshold, an activation instruction, a target quantity N of times, and an interval T that are from the source gateway station and forwarded by the satellite. The activation instruction instructs the terminal device to send the uplink reference signal when the quality of the downlink signal is lower than the first threshold. The target quantity N of times indicates a quantity of times that the terminal device sends the uplink reference signal. The interval T indicates duration from sending the uplink reference signal by the terminal device for N times to detecting the quality of the downlink signal again, where N is an integer greater than or equal to 1.

At least one of the first threshold, the activation instruction, the target quantity N of times, and the interval T may be carried in broadcast information.

Alternatively, at least one of the first threshold, the activation instruction, the target quantity N, and the interval T is carried in connected mode information, where the connected mode information includes at least one of RRC information, downlink control information DCI, group DCI, a media access control MAC element, and a timing advance command TAC. Alternatively, at least one of the first threshold, the activation instruction, the target quantity N of times, and the interval T is sent through a physical downlink shared data channel.

The transceiver unit may be further configured to receive second indication information sent by the source gateway station through the satellite, where the second indication information indicates a transmission resource of the uplink reference signal.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords.

According to a fifth aspect, an embodiment may provide a communication apparatus, including:

a sending unit, configured to send third indication information to a target gateway station, where the third indication information indicates the target gateway station to feed back second channel quality to a source gateway station, and the second channel quality represents quality of a link from a terminal device to the target gateway station through a satellite;

a receiving unit, configured to receive the second channel quality from the target gateway station; and a processing unit, configured to determine, based on the second channel quality and first channel quality, whether to switch the terminal device to the target gateway station, where the first channel quality represents quality of a link from the terminal device to the source gateway station through the satellite.

Before the sending unit sends the third indication information to the target gateway station, the processing unit may be further configured to determine that the first channel quality is lower than a first threshold.

Before the sending unit sends the third indication information to the target gateway station, the receiving unit may be further configured to receive first indication information that is from the terminal device and that is forwarded by the satellite, where the first indication information indicates that channel quality of the link from the terminal device to the source gateway station through the satellite is lower than a first threshold.

When the first indication information is an uplink reference signal of a preset structure, the uplink reference signal may be further used by the source gateway station to detect the first channel quality and the target gateway station to detect the second channel quality.

Before the receiving unit receives the first indication information that is from the terminal device and that is forwarded by the satellite, the sending unit may be further configured to send at least one of a first threshold, an activation instruction, a target quantity N of times, and an interval T to the terminal device through the satellite. The activation instruction instructs the terminal device to send the uplink reference signal when the quality of the downlink signal is lower than the first threshold. The target quantity N of times indicates a quantity of times that the terminal device sends the uplink reference signal. The interval T indicates duration from sending the uplink reference signal by the terminal device for N times to detecting the quality of the downlink signal again, where N is an integer greater than or equal to 1.

At least one of the first threshold, the activation instruction, the target quantity N of times, and the interval T may be carried in broadcast information.

Alternatively, at least one of the first threshold, the activation instruction, the target quantity N, and the interval T is carried in connected mode information, where the connected mode information includes at least one of RRC information, downlink control information DCI, group DCI, a media access control MAC element, and a timing advance command TAC. Alternatively, at least one of the first threshold, the activation instruction, the target quantity N of times, and the interval T is sent through a physical downlink shared data channel.

The processing unit may be configured to switch the terminal device from the source gateway station to the target gateway station when the first channel quality is lower than a second threshold and the second channel quality is higher than or equal to the second threshold. Alternatively, the processing unit is configured to switch each terminal device in a target area from the source gateway station to the target gateway station when the first channel quality is lower than a second threshold and the second channel quality is higher than or equal to the second threshold. The target area is a cell or a beam coverage area in which the terminal device is located. The cell includes at least one beam coverage area. The cell is included in a coverage area of the satellite.

The processing unit may be configured to perform satellite switching on the terminal device when the first channel quality is lower than a second threshold and the second channel quality is lower than the second threshold. Alternatively, the processing unit is configured to perform satellite switching on each terminal device in a target area when the first channel quality is lower than the second threshold and the second channel quality is lower than the second threshold. The target area is a cell or a beam coverage area in which the terminal device is located. The cell includes at least one beam coverage area. The cell is included in a coverage area of the satellite.

Before the receiving unit receives the second channel quality from the target gateway station, the sending unit may be further configured to send second indication information to the terminal device through the satellite, where the second indication information indicates a transmission resource for transmitting the uplink reference signal, and the uplink reference signal is used to detect the first channel quality.

The third indication information may further indicate a transmission resource on which the uplink reference signal is located, and the uplink reference signal is used to detect the first channel quality.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords.

The sending unit may be further configured to send fourth indication information to the satellite, where the fourth indication information indicates the satellite to send the uplink reference signal to the source gateway station and the target gateway station.

According to a sixth aspect, an embodiment may provide a communication apparatus, including:

a receiving unit, configured to receive third indication information sent by a source gateway station, where the third indication information indicates a target gateway station to feed back second channel quality to the source gateway station, and the second channel quality represents quality of a link from a terminal device to the target gateway station through a satellite;

a processing unit, configured to determine the second channel quality; and a sending unit, configured to send the second channel quality to the source gateway station.

The receiving unit may be further configured to receive an uplink reference signal that is from the terminal device and that is forwarded by the satellite.

The processing unit is configured to determine the second channel quality based on the uplink reference signal.

The third indication information may further indicate a transmission resource on which the uplink reference signal is located, and the uplink reference signal may be used to detect the first channel quality.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords.

According to a seventh aspect, an embodiment may provide a communication apparatus, including a processor, a memory, and a computer program that is stored in the memory and that can run on the processor. When the processor executes the program, the communication apparatus is enabled to implement the method in the first aspect or the possible implementations of the first aspect.

According to an eighth aspect, an embodiment may provide a communication apparatus, including a processor, a memory, and a computer program that is stored in the memory and that can run on the processor. When the processor executes the program, the communication apparatus is enabled to implement the method in the second aspect or the possible implementations of the second aspect.

According to a ninth aspect, an embodiment may provide a communication apparatus, including a processor, a memory, and a computer program that is stored in the memory and that can run on the processor. When the processor executes the program, the communication apparatus is enabled to implement the method in the third aspect or the possible implementations of the third aspect.

According to a tenth aspect, an embodiment may provide a communication apparatus, including a logic circuit and an input interface. The input interface is configured to obtain to-be-processed data, and the logic circuit is configured to perform the method according to any implementation of the first aspect on the to-be-processed data, to obtain processed data.

The communication apparatus may further include an output interface, and the output interface is configured to output the processed data.

According to an eleventh aspect, an embodiment may provide a communication apparatus, including a logic circuit and an input interface. The input interface is configured to obtain to-be-processed data, and the logic circuit is configured to perform the method according to any implementation of the second aspect on the to-be-processed data, to obtain processed data.

The communication apparatus may further include an output interface, and the output interface is configured to output the processed data.

According to a twelfth aspect, an embodiment may provide a communication apparatus, including a logic circuit and an input interface. The input interface is configured to obtain to-be-processed data, and the logic circuit is configured to perform the method according to any implementation of the third aspect on the to-be-processed data, to obtain processed data.

The communication apparatus may further include an output interface, and the output interface is configured to output the processed data.

According to a thirteenth aspect, an embodiment may provide a non-transitory computer-readable storage medium, where the non-transitory computer-readable storage medium is configured to store a program. When the program is executed by a processor, the program is used to perform the method according to any implementation of the first aspect.

According to a fourteenth aspect, an embodiment may provide a non-transitory computer-readable storage medium, where the non-transitory computer-readable storage medium is configured to store a program. When the program is executed by a processor, the program is used to perform the method according to any implementation of the second aspect.

According to a fifteenth aspect, an embodiment may provide a non-transitory computer-readable storage medium, where the non-transitory computer-readable storage medium is configured to store a program. When the program is executed by a processor, the program is used to perform the method according to any implementation of the third aspect.

According to a sixteenth aspect, an embodiment may provide a computer program product. When the computer program product runs on a communication apparatus, the communication apparatus is enabled to perform the method according to any one of the first aspect or the possible implementations of the first aspect.

According to a seventeenth aspect, an embodiment may provide a computer program product. When the computer program product runs on a communication apparatus, the communication apparatus is enabled to perform the method according to any one of the second aspect or the possible implementations of the second aspect.

According to an eighteenth aspect, an embodiment may provide a computer program product. When the computer program product runs on a communication apparatus, the communication apparatus is enabled to perform the method according to any one of the third aspect or the possible implementations of the third aspect.

According to the gateway station switching method provided in embodiments, when the quality of the link from the terminal device to the source gateway station through the satellite is poor, the source gateway station sends the third indication information to the target gateway station, so that the target gateway station feeds back the second channel quality to the source gateway station, that is, the quality of the link from the terminal device to the target gateway station through the satellite. The source gateway station determines, based on the second channel quality and first channel quality that represents the quality of the link from the terminal device to the source gateway station through the satellite, whether to switch the terminal device to the target gateway station. In this process, the source gateway station determines whether to switch the gateway station by comparing the quality of the link from the source gateway station to the terminal device through the satellite and the quality of the link from the target gateway station to the terminal device through the satellite, thereby improving communication quality.

DETAILED DESCRIPTION OF THE EMBODIMENTS

In a common terrestrial network, there is no relay such as a satellite on a link between a terminal device and a network device, and the network device detects link quality by using an uplink reference signal sent by the terminal device. There are three manners of sending the uplink reference signal.

In a first manner, the uplink reference signal is periodically sent. In this manner, the network device configures, for the terminal device, a resource used to periodically send the uplink reference signal. The terminal device periodically sends the uplink reference signal.

In a second manner, the uplink reference signal is semi-statically sent. In this manner, the network device configures a semi-static resource for the terminal device. After receiving the resource, the terminal device does not immediately send the uplink reference signal, but periodically sends the uplink reference signal after receiving an activation instruction sent by the network device.

In a third manner, the uplink reference signal is aperiodically sent. In this manner, the network device configures an aperiodic resource for the terminal device. The terminal device sends the uplink reference signal on the aperiodic resource only after receiving an instruction sent by the network device.

NTN communication includes satellite communication and high-altitude platform communication. This type of network device is hundreds of kilometers to tens of thousands of kilometers above the ground. Therefore, the NTN has features such as large coverage and flexible networking. The NTN is developing towards a T-bit level. A link from a terminal device to a gateway station (gateway) through a satellite includes a service link between the terminal device and the satellite, and a feeder link between the satellite and the gateway station. A main function of the satellite is transparent transmission.

It can be understood from the foregoing that: If a link detection method in a terrestrial network continues to be used, the gateway station detects link quality by using an uplink reference signal that is from the terminal device and that is forwarded by the satellite. When determining that the link quality is poor, the gateway station cannot further determine whether a severe propagation loss occurs on the feeder link or the service link. For example, refer to FIG. 1A to FIG. 1C.

Figure 1A:
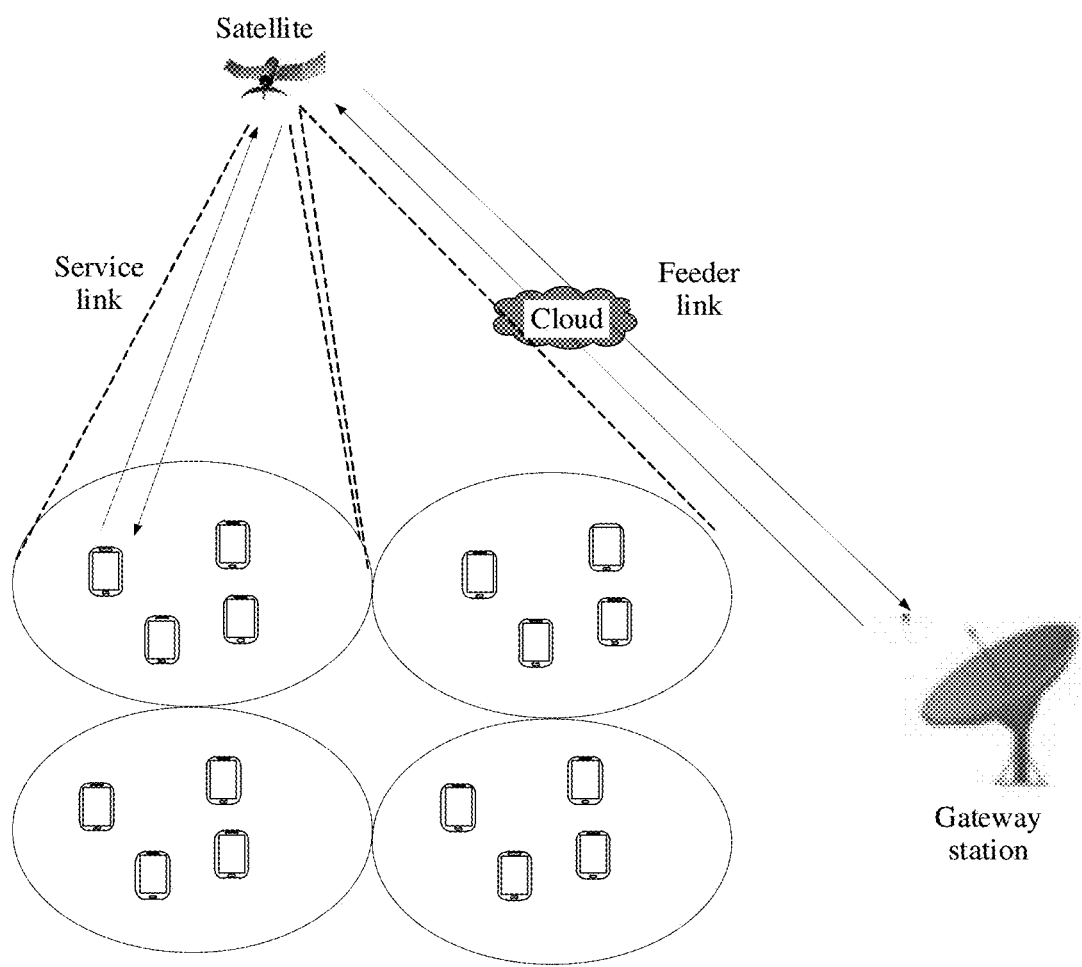
FIG. 1A is a schematic diagram of poor quality of a feeder link.

FIG. 1A is a schematic diagram of poor quality of a feeder link. Refer to FIG. 1A, a terminal device is located in a beam coverage area of a satellite. A service link is established between the terminal device and the satellite, and a feeder link is established between the satellite and a gateway station. Affected by weather, quality of the feeder link is poor.

Figure 1B:
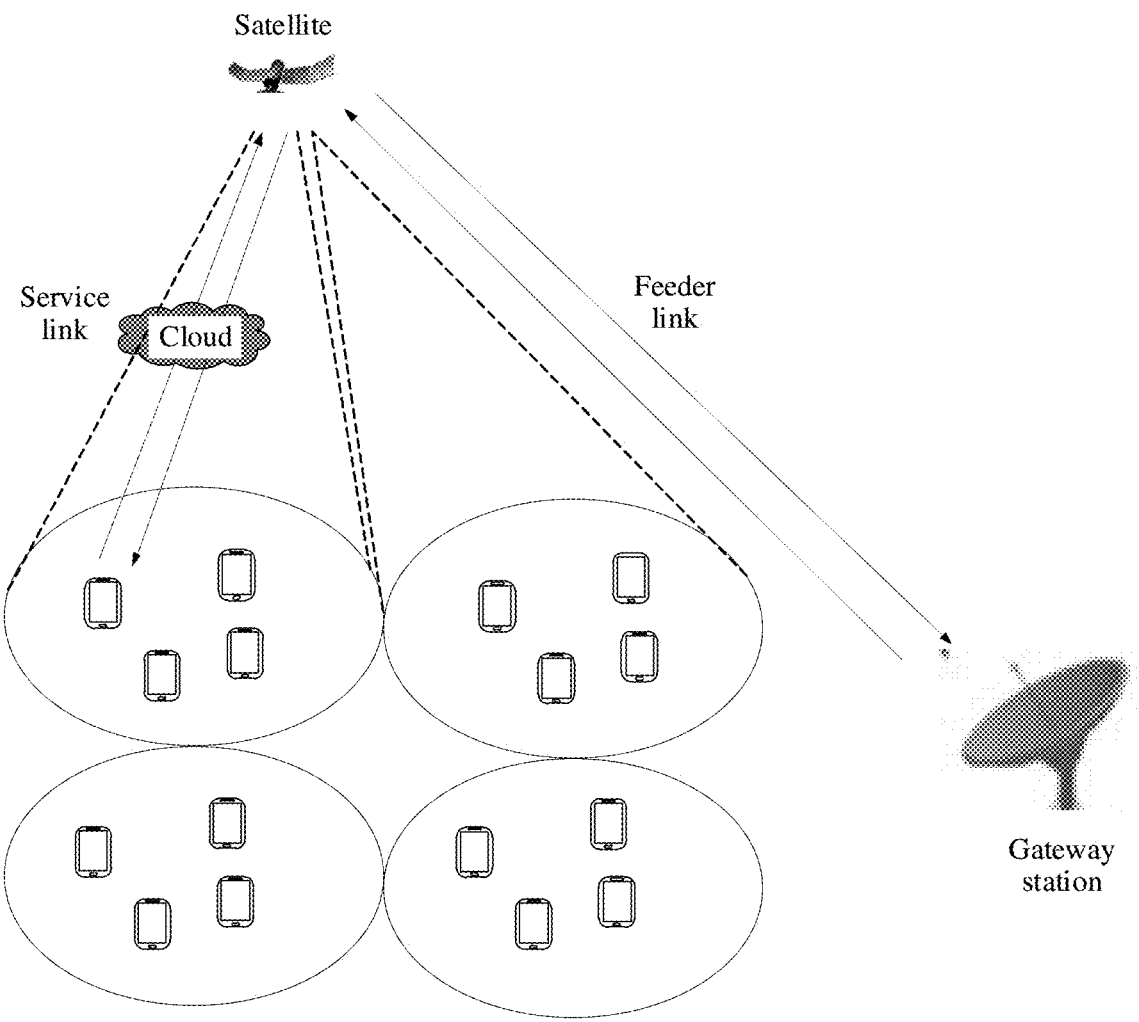
FIG. 1B is a schematic diagram of poor quality of a service link.

FIG. 1B is a schematic diagram of poor quality of a service link. Refer to FIG. 1B, a terminal device is located in a beam coverage area of a satellite. A service link is established between the terminal device and the satellite, and a feeder link is established between the satellite and a gateway station. Affected by weather, quality of the service link is poor.

Figure 1C:
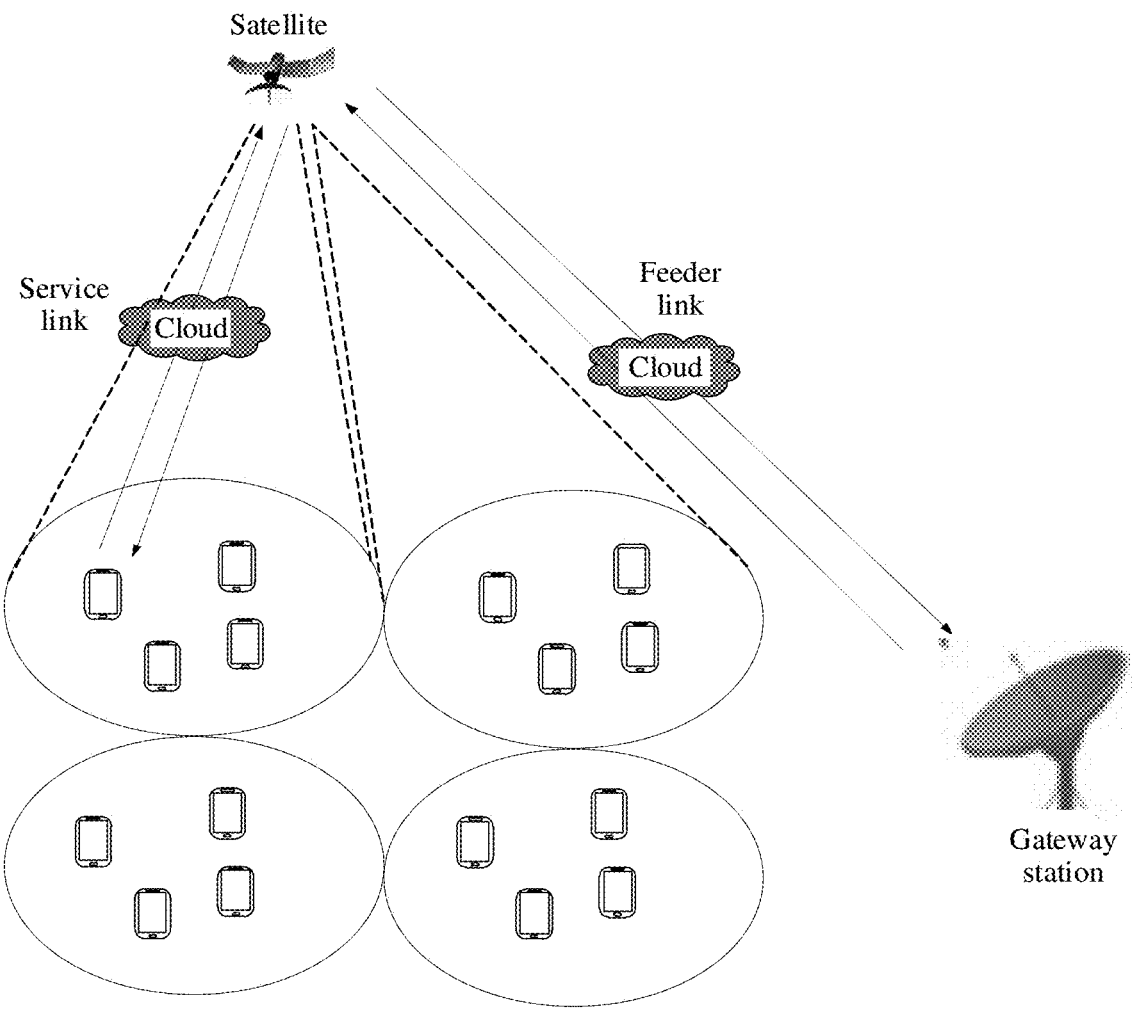
FIG. 1C is a schematic diagram of poor quality of both a service link and a feeder link.

FIG. 1C is a schematic diagram of poor quality of both a service link and a feeder link. Refer to FIG. 1C, a terminal device is located in a beam coverage area of a satellite. A service link is established between the terminal device and the satellite, and a feeder link is established between the satellite and a gateway station. Affected by weather, quality of both the service link and the feeder link is poor.

As shown in FIG. 1A to FIG. 1C, both the service link and the feeder link are affected by weather, and a working mode of the satellite is transparent forwarding. The terminal device detects, by using a downlink reference signal that is from the gateway station and forwarded through the satellite, channel quality including channel quality of the feeder link and channel quality of the service link, and the two channel quality cannot be separated. Similarly, the channel quality detected by the gateway station by using the uplink reference signal also includes the channel quality of the feeder link and the channel quality of the service link, and the gateway station cannot separate the channel quality of the two parts.

In addition, if the terminal device sends the uplink reference signal in the foregoing first or second manner, power of the terminal device is wasted. If the terminal device sends the uplink reference signal in the foregoing third manner, that is, when the terminal device sends the uplink reference signal irregularly for a plurality of times, aperiodic sending of the uplink reference signal causes large signaling interaction and affects uplink and downlink data transmission efficiency.

Generally, when a feeder link between a satellite and a gateway station is severely affected by weather or the like, gateway station switching needs to be performed to prevent interruption of communication between a terminal device and a network device. When quality of a service link between a satellite and a terminal device is poor, satellite switching needs to be performed. Obviously, if the gateway station cannot determine whether the feeder link quality or the service link quality is poor, the gateway station cannot determine whether to switch the gateway station.

In view of this, the embodiments may provide a gateway station switching method and a communication apparatus, to determine whether to switch a gateway station by comparing quality of a link from a source gateway station to a terminal device through a satellite and quality of a link from a target gateway station to the terminal device through the satellite, thereby improving communication quality.

The gateway station switching method provided in the embodiments may relate to three execution bodies: a source gateway station, a target gateway station, and a terminal device, and may be used in an NTN communication system. The NTN communication system is established based on a 4th generation (4G) mobile communication system (for example, long term evolution (LTE), advanced long term evolution (LTE-A)), 3rd generation partnership project (3GPP) related cellular systems, 5th generation (5G) mobile communication systems, and subsequent evolved communication systems. 5G may also be referred to as new radio (NR).

In the embodiments, the gateway station may also be referred to as a gateway, or the like. The gateway station may be disposed separately from a network device such as a gNB in 5G or an eNB in LTE, or may be integrated with a gNB, an eNB, or the like. Unless otherwise specified in the following, the gateway station, including a source gateway station and a target gateway station, is a gateway station integrating functions of a network device. The source gateway station refers to a gateway station that currently provides a communication service for the terminal device in a beam coverage area of a satellite, and the target gateway station is a gateway station that provides a service for the terminal device after gateway station switching. In other words, the target gateway station is the gateway station that has a capability of providing the communication service for the terminal device but has not provided the service for the terminal device currently. It may be understood that, if both the source gateway station and the target gateway station are disposed separately from the network device, in the embodiments, the source gateway station sends first channel quality to the network device and the target gateway station sends second channel quality to the network device, and the network device determines whether to perform gateway station switching.

The satellite is a satellite working in a transparent forwarding mode, and may determine, based on control of an earth station (not shown in the figure), to send the uplink reference signal from the terminal device to one or more gateway stations. In addition, the satellite may be preconfigured to forward the uplink reference signal from the terminal device to the plurality of gateway stations, or the source gateway station may trigger the satellite to forward the uplink reference signal from the terminal device to the plurality of gateway stations. This is not limited in the embodiments. The gateway station may have a function of the earth station. In other words, the earth station and the gateway station may be combined into one. In this case, the gateway station has both a wireless communication management function and a satellite control function.

The terminal device includes, but is not limited to, a device connected through a wired line, for example, a public switched telephone network (PSTN), a digital subscriber line (DSL), a digital cable, a direct cable; and/or another data connection/network; and/or a wireless interface, for example, a cellular network, a wireless local area network (WLAN), a digital television network such as a DVB-H network, a satellite network, or an AM-FM broadcast transmitter; and/or an apparatus set to receive/send a communication signal by another terminal device; and/or an Internet of Things (IoT). A terminal device that is set to communicate through a wireless interface may be referred to as a "wireless communication terminal", a "wireless terminal", or a "mobile terminal". Examples of the terminal device include, but are not limited to, a satellite phone or a cellular phone; a personal communication system (PCS) terminal that may combine a cellular radio phone with data processing, facsimile, and data communication capabilities; a PDA that may include a radio telephone, a pager, Internet/intranet access, a Web browser, a note book, a calendar, and/or a Global Positioning System (GPS) receiver; and a conventional laptop and/or handheld receiver or other electronic apparatus including a radiotelephone transceiver. The terminal device may be referred to as an access terminal, a subscriber unit, a subscriber station, a mobile station, a mobile station, a remote station, a remote terminal, a mobile device, a user terminal, a terminal, a wireless communication device, a user agent, a user apparatus, or the like. The terminal device may alternatively be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal in a future 5G network, a UE in a 5G network or a future evolved terminal, or the like.

Figure 2:
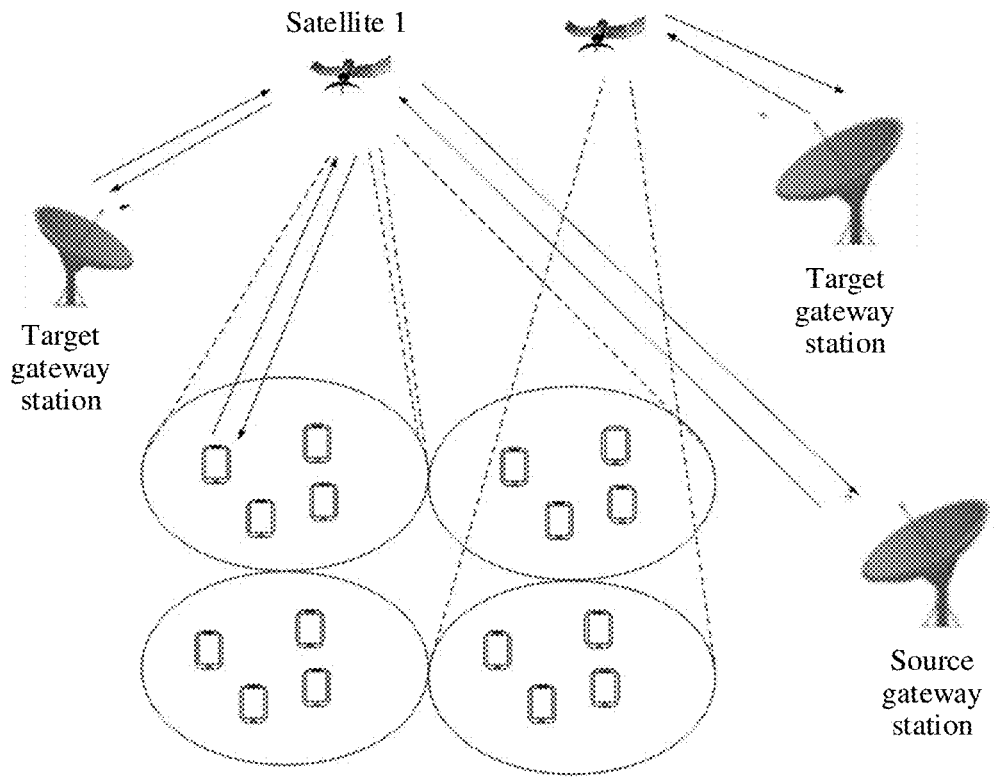
FIG. 2 is a schematic diagram of a network architecture to which a gateway station switching method is applicable according to an embodiment.

FIG. 2 is a schematic diagram of a network architecture to which a gateway station switching method is applicable according to an embodiment. Refer to FIG. 2, the network architecture includes a terminal device, a satellite 1, a satellite 2, a source gateway station, a target gateway station, a core network, and the like. A service link is established between the terminal device and the satellite 1, and a feeder link is established between the satellite 1 and the source gateway station. A beam coverage area of the satellite includes a beam coverage area 1 to a beam coverage area 4 and other beam coverage areas (not shown in the figure). The source gateway station provides a communication service for the beam coverage area 1 in which the terminal device is located. In addition, the source gateway station may also provide a communication service for terminal devices in the beam coverage area 2 to the beam coverage area 4. The target gateway station is a backup gateway, and a feeder link may be established between the target gateway station and the satellite 1. If gateway station switching is performed on the terminal device, a communication service is provided for the terminal device. A distance between the satellite 2 and the satellite 1 is long. If satellite switching is performed on the terminal device, the satellite 2 may provide a service for the terminal device. Each ellipse in the figure represents a beam coverage area. Channel quality of the service link and the feeder link may be severely attenuated due to weather, blockage, or the like.

In FIG. 2, there is at least one target gateway station. Unless otherwise specified, the following target gateway station is any one of the two target gateway stations in FIG. 2.

Based on FIG. 2, for clarity, terms are defined as follows.

First channel quality: quality of a link from the terminal device to the source gateway station through the satellite 1.

Second channel quality: quality of a link from the terminal device to the target gateway station through the satellite 1.

First indication information: indication information that is sent by the terminal device to the source gateway station through the satellite 1 and that indicates that the first channel quality is lower than a first threshold.

Second indication information: indication information that is sent by the source gateway station to the terminal device through the satellite and that indicates a transmission resource of an uplink reference signal.

Third indication information: indication information sent by the source gateway station to the target gateway station and that indicates the target gateway station to feed back the second channel quality to the source gateway station.

Fourth indication information: indication information sent by the source gateway station to the satellite 1 and that indicates the satellite 1 to send the uplink reference signal to a plurality of gateway stations, where the fourth indication information may also be sent by the source gateway station to an earth station, so that the earth station triggers the satellite 1 to send the uplink reference signal to the plurality of gateway stations. Alternatively, the fourth indication information may not be required. For example, based on a weather condition, the earth station triggers, from 3 p.m. to 6 p.m., the satellite 1 to send the uplink reference signal to the plurality of gateway stations. In addition, the source gateway station also interacts with the target gateway station based on the weather condition from 3 p.m. to 6 p.m. In addition, if energy saving and interference are not considered, the satellite may always forward, to the plurality of gateway stations, signals received by the satellite from the terminal device.

Figure 3:
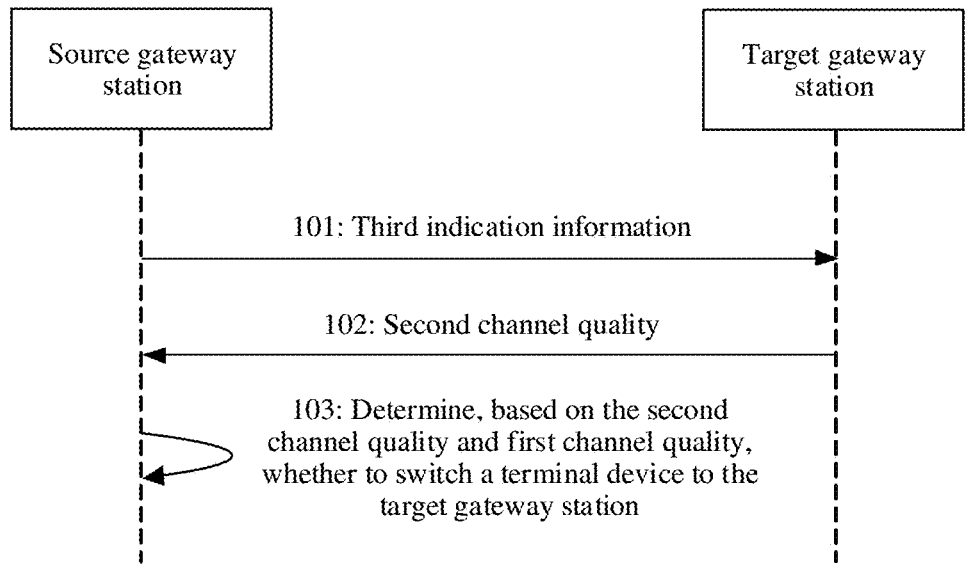
FIG. 3 is a flowchart of a gateway station switching method according to an embodiment.

The following describes in detail the gateway station switching method in the embodiments based on the network architecture shown in FIG. 2. For example, FIG. 3 is a flowchart of a gateway station switching method according to an embodiment. This embodiment describes the embodiments in detail from a perspective of switching between a source gateway station and a target gateway station. This embodiment includes the following steps.

101: The source gateway station sends third indication information to the target gateway station.

Correspondingly, the target gateway station receives the third indication information from the source gateway station, where the third indication information indicates the target gateway station to feed back second channel quality to the source gateway station, and the second channel quality represents quality of a link from a terminal device to the target gateway station through a satellite.

For example, when learning that quality of a link from the terminal device to the source gateway station through a satellite 1 is poor, the source gateway station sends the third indication information to the target gateway station. The third indication information may be carried in signaling such as measurement and report signaling and sent to the target gateway station.

For example, in a process of providing a communication service for the terminal device, if the source gateway station finds that quality of an uplink signal, for example, an uplink reference signal or an uplink data signal, that is from the terminal device and that is forwarded through the satellite is lower than a first threshold, it is considered that the quality of the link from the terminal device to the source gateway station through the satellite 1 is poor, and first channel quality is obtained. The first channel quality represents quality of a link from the terminal device to the source gateway station through the satellite. In this case, the source gateway station actively sends the third indication information to the target gateway station. According to this solution, the source gateway station actively triggers gateway station switching. It should be noted that when the quality of the uplink reference signal or the uplink data signal is equal to the first threshold, it may be considered that quality of the link from the terminal device to the source gateway station through the satellite 1 is poor. In other words, when a value is exactly equal to the threshold, this case may be combined into a case in which the value is lower than the threshold or may be combined into a case in which the value is higher than the threshold. A solution may be for a case in which the value is equal to the threshold. This is not limited in the embodiments. Cases related to a threshold in embodiments are similar and details are not described again.

For another example, when the terminal device detects that quality of a downlink signal that is from the source gateway station and that is forwarded by a satellite is lower than the first threshold, the terminal device sends first indication information to the source gateway station through the satellite, to trigger the source gateway station to send the third indication information to the target gateway station. The first indication information indicates, to the source gateway station, that the first channel quality is lower than the first threshold. The first indication information may explicitly indicate, to the source gateway station, that the first channel quality is lower than the first threshold. For example, 0 indicates that the first channel quality is lower than the first threshold, and 1 indicates that the first channel quality is higher than or equal to the first threshold. Alternatively, the first indication information may implicitly indicate, to the source gateway station, that the first channel quality is lower than the first threshold. For example, an uplink reference signal with a special structure is agreed upon in advance. If the source gateway station receives the uplink reference signal with the special structure that is sent by the terminal device through the satellite, it is considered that the first channel quality is lower than the first threshold. According to this solution, the terminal device actively triggers gateway station switching.

Optionally, the third indication information may further indicate, to the target gateway station, a transmission resource for carrying the uplink reference signal, a scrambling code and a modulation and coding scheme (MCS) that are used when the terminal device sends the uplink reference signal, a round-trip delay of a feeder link between the source gateway station and the satellite, a round-trip delay difference between the source gateway station, the target gateway station, and the satellite, and the like.

102: The target gateway station sends the second channel quality to the source gateway station.

Correspondingly, the source gateway station receives the second channel quality from the target gateway station.

103: The source gateway station determines, based on the second channel quality and the first channel quality, whether to switch the terminal device to the target gateway station.

The first channel quality represents the quality of the link from the terminal device to the source gateway station through the satellite. The first channel quality may be the downlink signal used by the source gateway station.

For example, the first channel quality may be obtained by the source gateway station by using the uplink signal forwarded by the terminal device through the satellite in a process of serving the terminal device, or may be obtained by the terminal device by using the downlink signal that is from the source gateway station and that is forwarded by the satellite, and notified to the source gateway station by using the first indication information. Alternatively, the first channel quality may be obtained by the source gateway station after receiving the first indication information that is from the terminal device and that is forwarded by the satellite and measuring the uplink reference signal forwarded by the terminal device through the satellite. The first channel quality includes quality of a service link from the terminal device to the satellite 1 and quality of a feeder link from the satellite 1 to the source gateway station. The second channel quality includes the quality of the service link from the terminal device to the satellite 1 and quality of a feeder link from the satellite 1 to the target gateway station. Because the service links are the same, it may be understood that a reason why the first channel quality is different from the second channel quality is that feeder links are different. It is clearly that if the second channel quality is higher than the first channel quality, the quality of the feeder link from the satellite 1 to the target gateway station is better than the quality of the feeder link from the satellite 1 to the source gateway station. In this case, gateway station switching can improve the quality of the feeder link.

According to the gateway station switching method provided in this embodiment, when the quality of the link from the terminal device to the source gateway station through the satellite is poor, the source gateway station sends the third indication information to the target gateway station, so that the target gateway station feeds back the second channel quality to the source gateway station, that is, the quality of the link from the terminal device to the target gateway station through the satellite. The source gateway station determines, based on the second channel quality and first channel quality that represents the quality of the link from the terminal device to the source gateway station through the satellite, whether to switch the terminal device to the target gateway station. In this process, the source gateway station determines whether to switch the gateway station by comparing the quality of the link from the source gateway station to the terminal device through the satellite and the quality of the link from the target gateway station to the terminal device through the satellite, thereby improving communication quality.

In the foregoing embodiments, when determining, based on the second channel quality and the first channel quality, whether to switch the terminal device to the target gateway station, the source gateway station compares the first channel quality and the second channel quality with a second threshold. For example, the first threshold may be 12 dB, and the second threshold may be 10 dB, where the second threshold is a threshold used by the source gateway station to determine whether to perform gateway station switching or satellite switching. Herein, a value relationship between the first threshold and the second threshold and values of the first threshold and the second threshold are not limited in this embodiment. In a determining process, because the link from the terminal device to the source gateway station through the satellite is the same as a service link in the link from the terminal device to the target gateway station through the satellite, but feeder links are different, when the first channel quality is lower than the second threshold, and the second channel quality is higher than or equal to the second threshold, it indicates that compared with a feeder link from the satellite to the source gateway station, quality of a feeder link from the satellite to the target gateway station is better. Therefore, the source gateway station switches the terminal device from the source gateway station to the target gateway station. Switching may be performed at a terminal device level, a cell level, or a beam coverage area level. The terminal device level means that only one terminal device is switched from the source gateway station to the target gateway station. An entire coverage area of the satellite may be divided into a plurality of cells, and each cell may include a plurality of beam coverage areas. Therefore, cell-level switching means that all terminal devices in a cell in which the terminal device is located are switched to the target gateway station. Beam coverage area-level switching means that all terminal devices in a beam coverage area in which the terminal device is located are switched to the target gateway station. A cell or a beam coverage area to which the terminal device needs to be switched is referred to as a target area. This solution implements gateway station switching at the terminal device level, the cell level, or the beam coverage area level.

When the first channel quality is lower than the second threshold, and the second channel quality is lower than the second threshold, it indicates that quality of both the two feeder links is very poor. In this case, if the gateway station is switched, quality of an entire link (a terminal device to a satellite to a gateway station) cannot be improved. Therefore, satellite switching needs to be performed on the terminal device. Switching may be performed at the terminal device level, the cell level, or the beam coverage area level. The terminal device level means that only one terminal device is switched from the satellite 1 to a satellite 2. Cell-level switching means that all the terminal devices in the cell in which the terminal device is located are switched from the satellite 1 to the satellite 2. Beam coverage area-level switching means that all the terminal devices in the beam coverage area in which the terminal device is located are switched from the satellite 1 to the satellite 2. The cell or the beam coverage area to which the terminal device needs to be switched is referred to as the target area. This solution implements satellite switching at the terminal device level, the cell level, or the beam coverage area level.

It may be understood that different beam coverage areas may be distinguished based on a bandwidth part (BWP), a transmission configuration indicator (TCI), or a synchronization signal block (SSB). In other words, when the satellite switching or the gateway station switching is the beam coverage area-level switching, the beam coverage area may be indicated based on the BWP, the TCI, or the SSB. For example, BWP, TCI, or SSB switching may be performed between the terminal device and the source gateway station to indicate beam coverage area switching. Therefore, for the terminal device or the source gateway station, BWP, TCT, or SSB switching may be actually performed. In addition, a beam in this embodiment may be replaced with the BWP, the TCI, the SSB, or the like.

In the foregoing embodiments, from the perspective of energy saving and interference avoidance, the satellite does not always forward signals of all cells/beam coverage areas to all gateway stations. Generally, only a signal of a beam coverage area/cell served by the gateway station is forwarded. In other words, for the source gateway station, the satellite forwards only a signal of the terminal device in a beam coverage area/cell in which the source gateway station provides a communication service and does not forward the signal to the target gateway station at the same time. Similarly, the satellite does not forward, to the source gateway station, a signal of the terminal device in the beam coverage area/cell served by the target gateway station. Therefore, when the source gateway station indicates the target gateway station to feed back the second channel quality, the satellite needs to forward the uplink reference signal or the uplink signal from the terminal device to the target gateway station, so that the target gateway station obtains the second channel quality by using the uplink reference signal or the uplink signal and feeds back the second channel quality to the source gateway station. The following describes in detail how the target gateway station detects the second channel quality.

For example, when the source gateway station interacts with the target gateway station, an earth station works cooperatively to send an instruction to the satellite 1, so that the satellite 1 sends the uplink reference signal from the terminal device to the target gateway station and the source gateway station. Alternatively, the satellite 1 sends, to the target gateway station and the source gateway station, an uplink reference signal from another terminal device in a cell in which the terminal device is located or in a beam coverage area. In this case, in consideration of a delay generated when the earth station sends the instruction to the satellite, when the source gateway station configures, for the terminal device, a transmission resource used to send the uplink reference signal, the delay generated when the earth station sends the instruction to the satellite needs to be considered. In this way, sufficient time is reserved for the satellite to receive related instructions.

The earth station controls the satellite to send the uplink reference signal to a plurality of gateway stations, which can be understood from a perspective of ports. For example, the satellite receives the uplink reference signal from the terminal device through a port 1, forwards the uplink reference signal to the source gateway station through a port 10, and forwards the uplink reference signal to the target gateway station through a port 11.

In the foregoing embodiments, the source gateway station may trigger the satellite to send the instruction to the earth station, so that the satellite sends the uplink reference signal to the plurality of gateway stations. In addition, the source gateway station may directly send fourth indication information to the satellite, to indicate the satellite to send the uplink reference signal to the plurality of gateway stations. Alternatively, preconfiguration may be performed on the earth station based on weather and the like, so that the earth station sends the instruction to the satellite based on the preconfiguration. For example, it can be understood based on the weather forecast that: There will be rainstorm weather from 3 p.m. to 6 p.m. on a day of a month in a year. Therefore, it is preconfigured on the earth station that an instruction is sent to the satellite from 3 p.m. to 6 p.m. on the day of the month in the year. At the same time, it is preconfigured that the source gateway station also interacts with the target gateway station from 3:00 p.m. to 6:00 p.m. on the day of the month in the year.

In the foregoing embodiments, the source gateway station may preconfigure the transmission resource. The source gateway station may send second indication information to the terminal device through the satellite, where the second indication information indicates the transmission resource for transmitting the uplink reference signal, and the uplink reference signal may be used to detect the first channel quality. The second indication information may be configured in a bandwidth part (BWP). For example, new signaling, that is, DGWS-config, is added to BWP uplink dedicated signaling, and the transmission resource is configured by using the new signaling. In addition, the transmission resource may be further configured by using RRC signaling or the like. When interacting with the target gateway station, the source gateway station indicates the transmission resource to the target gateway station by using the first indication information. Then, when the terminal device sends the uplink reference signal on the transmission resource, the target gateway station and the source gateway station may receive the uplink reference signal on the transmission resource.

When the source gateway station preconfigures the transmission resource, the source gateway station may configure, based on a terminal device level, a beam coverage area, or a cell level, the transmission resource used to transmit the uplink reference signal. When the transmission resource is configured at a terminal device level, transmission resources of different terminal devices in a same beam coverage area or cell are mutual transmission resources that have a same time-frequency domain resource and different codewords. In other words, the transmission resources of the different terminal devices have different time domain resources and/or frequency domain resources, but codewords may be the same or different. In this way, the source gateway station and the target gateway station do not receive, on a same transmission resource, the uplink reference signal sent by different terminal devices. According to this solution, the source gateway station configures the transmission resource by using the terminal device as a unit.

When the source gateway station configures the transmission resource at the beam coverage area level or the cell level, the transmission resources of the different terminal devices in the same beam coverage area or cell are mutual transmission resources that have a same time-frequency domain resource and different codewords. In other words, the transmission resources of the terminal devices in a same beam coverage area or cell have a same time domain resource and a same frequency domain resource, but codewords of the terminal devices are different. The source gateway station may configure different codewords for the terminal devices or may configure one candidate codeword pool. The terminal device randomly selects a codeword from the candidate pool. In this way, a diversity gain can be avoided. In addition, different terminal devices have different transmission resources, or may have different polarization manners, multi-antenna transmission manners, time domains, frequency domains, codewords, beams, or the like.

In step 101, when the source gateway station actively triggers gateway station switching, the source gateway station sends the third indication information to the target gateway station, and at the same time, triggers the terminal device to send the uplink reference signal to the satellite, where the uplink reference signal is forwarded by the satellite to the source gateway station and the target gateway station. The source gateway station determines the first channel quality by using the uplink reference signal, and the target gateway station determines the second channel quality by using the uplink reference signal. In addition, when the source gateway station actively triggers gateway station switching, before the terminal device sends the uplink reference signal, the source gateway station can determine the first channel quality by using the uplink signal, for example, the uplink data signal or the uplink reference signal. Therefore, after receiving the uplink reference signal sent by the terminal device, the satellite may also send the uplink reference signal only to the target gateway station, but not to the source gateway station. If the uplink reference signal is sent to both the source gateway station and the target gateway station, the source gateway station determines the first channel quality again by using the uplink reference signal, and subsequently determines, based on the new first channel quality and second channel quality, whether to switch the gateway station. Alternatively, the source gateway station determines, based on an average value of the first channel quality and the second channel quality that are obtained through two times of measurement, whether to switch the gateway station, and the like. This is not limited in this embodiment.

When the terminal device triggers gateway station switching, there may be two cases in which the satellite forwards the uplink reference signal to the source gateway station and the target gateway station.

In a first case, the terminal device explicitly indicates, to the source gateway station, that the first channel quality is lower than the first threshold. For example, the first indication information is 1-bit information, where 0 indicates that the first channel quality is lower than the first threshold, and 1 indicates that the first channel quality is higher than the first threshold. Only when the first indication information is 0, the terminal device sends the first indication information to the source gateway station through the satellite. In this case, after sending the first indication information, the terminal device sends the uplink reference signal under triggering of the source gateway station. Alternatively, the terminal device waits for a duration, and actively sends the uplink reference signal to the satellite on a preconfigured transmission resource. The transmission resource is a resource that is configured by the source gateway station for the terminal device and that is used to send the uplink reference signal.

In a second case, the terminal device implicitly indicates, to the source gateway station, that the first channel quality is lower than the first threshold. For example, the terminal device and the source gateway station pre-agree on an uplink reference signal in a special format. When the terminal device detects that quality of a downlink signal that is from the source gateway station and that is forwarded by the satellite is lower than the first threshold, the terminal device transmits an uplink reference signal in a special format to the satellite on the transmission resource. The satellite forwards the uplink reference signal in the special format to the source gateway station and the target gateway station. The source gateway station determines the first channel quality by using the uplink reference signal, and the target gateway station determines the second channel quality by using the uplink reference signal. In this case, the terminal device does not need to send the uplink reference signal after sending the first indication information, thereby reducing a quantity of times that the terminal device sends the signal. It may be understood that the uplink reference signal in the special format may also be replaced with a common uplink reference signal. For example, an uplink sounding reference signal (SRS) or a dedicated demodulation reference signal (DMRS) may be used.

When poor quality of a link from the terminal device to the source gateway station through the satellite is caused by bad weather such as rainstorm, the function of triggering gateway station switching by the terminal device does not need to be always enabled but is enabled only in a time period of bad weather. That is, when the weather is abnormal, the source gateway station sends an activation instruction to the terminal device, where the activation instruction is used to activate a function of triggering gateway station switching by the terminal device. Then, the terminal device detects the quality of the downlink signal. When the quality of the downlink signal is lower than the first threshold, the terminal device sends the first indication information to the source gateway station through the satellite. In this case, a third case may further be derived: After the source gateway station sends the activation instruction to the terminal device through the satellite, regardless of whether the terminal device sends the first indication information, the satellite forwards the uplink signal, for example, the uplink reference signal or the uplink data signal, from the terminal device to the source gateway station and the target gateway station on the transmission resource, so that the source gateway station determines the first channel quality by using the uplink signal, and the target gateway station determines the second channel quality by using the uplink signal. Additionally, it may also be limited that the satellite forwards, only when the terminal device sends the first indication information, the uplink reference signal sent by the terminal device. The transmission resource is a resource that is configured by the source gateway station for the terminal device and that is used to send the uplink reference signal.

In the third case, after the source gateway station sends the activation instruction to the terminal device through the satellite, even if the terminal device has not sent the first indication information, the satellite forwards the uplink signal from the terminal device to the source gateway station and the target gateway station on the transmission resource. To reduce resource overheads, when the terminal device does not send the first indication information, the transmission resource may be used to send the uplink data signal. If the source gateway station and the target gateway station detect the uplink data signal on the transmission resource, channel quality measurement does not need to be performed.

If the source gateway station and the target gateway station detect the uplink reference signal on the transmission resource, channel quality measurement is performed. According to this solution, it is avoided that after the terminal device detects that the quality of the downlink signal is poor, the terminal device further needs to report the first indication information to trigger interaction between the source gateway station and the target gateway station, thereby reducing signaling interaction.

Figure 4A:
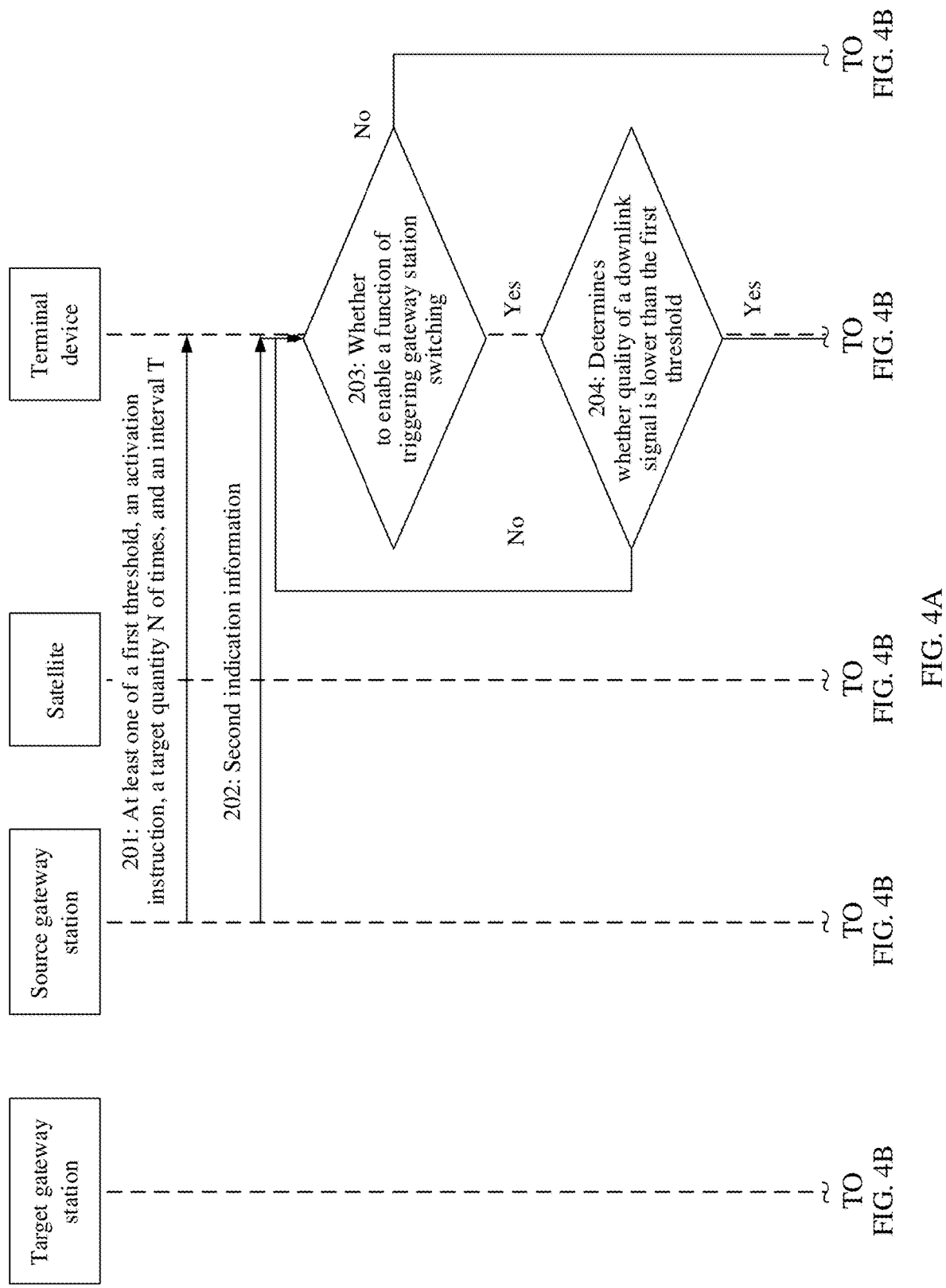
FIG. 4A and FIG. 4B are a flowchart of another gateway station switching method according to an embodiment.
Figure 4B:
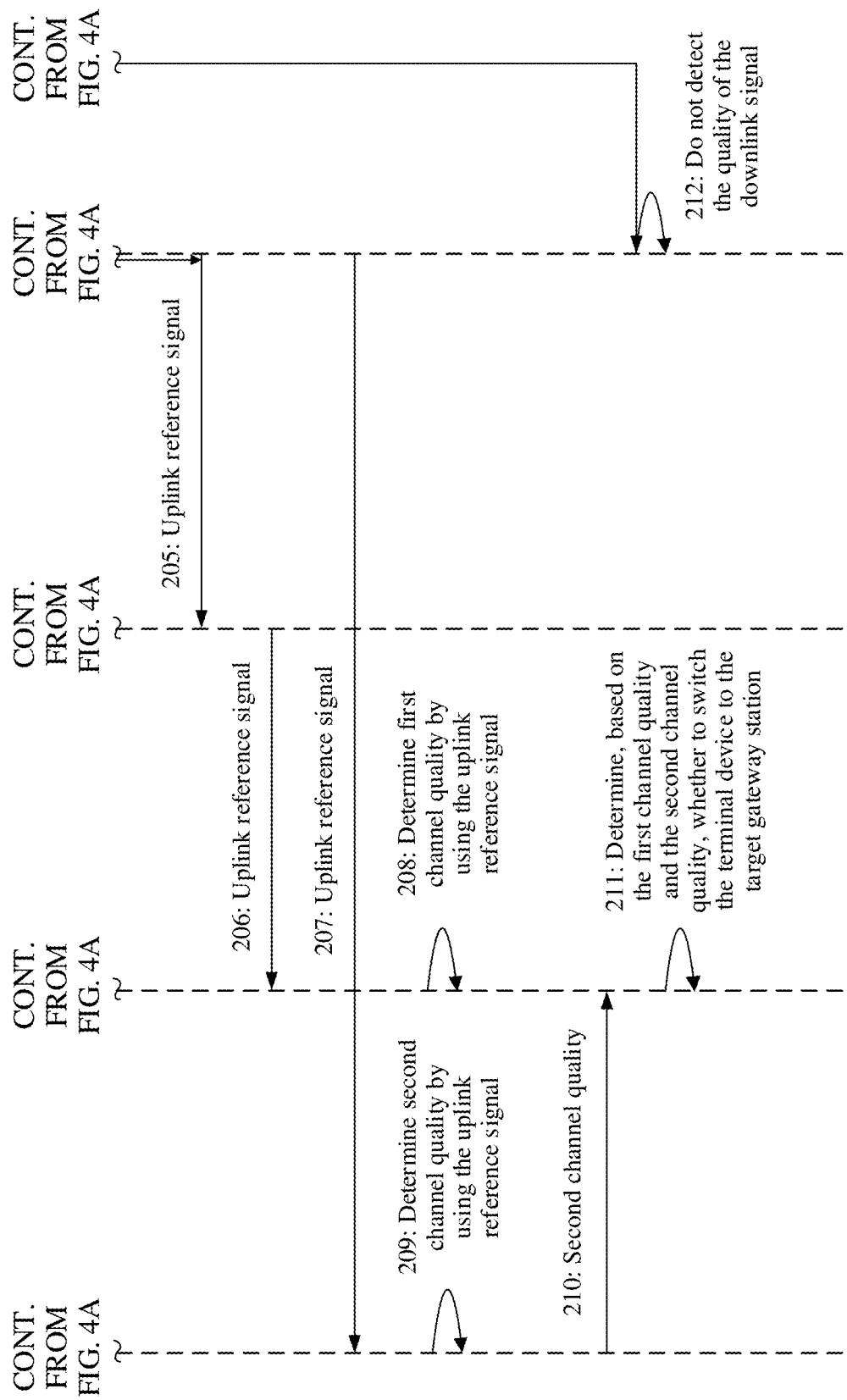

The following uses the foregoing second case as an example to describe in detail how the terminal device triggers the source gateway station to interact with the target gateway station. For example, FIG. 4A and FIG. 4B are a flowchart of another gateway station switching method according to an embodiment. The method includes the following steps.

201: A source gateway station sends at least one of a first threshold, an activation instruction, a target quantity N of times, and an interval T to a terminal device through a satellite.

The activation instruction instructs the terminal device to send an uplink reference signal when quality of a downlink signal is lower than the first threshold. The target quantity N of times indicates a quantity of times that the terminal device sends the uplink reference signal. The interval T indicates duration from sending the uplink reference signal by the terminal device for N times to detecting the quality of the downlink signal again, where N is an integer greater than or equal to 1.

For example, the source gateway station sends, based on the weather forecast or an actual weather condition, an activation instruction to the terminal device through the satellite in a broadcast, multicast, or unicast manner, where the activation instruction instructs the terminal device to activate a gateway station switching function. In other words, once detecting that the quality of the downlink signal is lower than the first threshold, the terminal device sends the uplink reference signal. The activation instruction may be indicated by using one bit, for example, a dynamic gateway switch trigger (DGS) trigger. When the DGS trigger=0, it indicates that the function is not activated. When the DGS trigger=1, it indicates that the function is activated.

When sending the activation instruction to the terminal device, the source gateway station may send the target quantity N of times, the first threshold (threshold1), the interval duration, or the like together to the terminal device. For example, the source gateway station adds at least one of the first threshold, the activation instruction, the target quantity N of times, and the interval T to broadcast information, and sends the broadcast information to the terminal device through the satellite. The broadcast information may be a system information block (SIB), other system information (OSI), a master information block (MIB), or the like. For another example, if the terminal device is in a radio resource control (RRC) connected mode, the source gateway station may further add at least one of the first threshold, the activation instruction, the target quantity N of times, and the interval T to connected mode information, and send the connected mode information to the terminal device. The connected mode information includes at least one of RRC information, downlink control information (DCI), group DCI, a media access control (MAC) element, and a timing advance command (TAC). For another example, the source gateway station sends at least one of the first threshold, the activation instruction, the target quantity N of times, and the interval T to the terminal device through a physical downlink shared data channel (PDSCH). In a subsequent communication process, the source gateway station may send a new first threshold or the like, to update the first threshold, to change a trigger frequency at which the terminal device sends the uplink reference signal, thereby preventing false triggering and saving energy of the terminal device.

202: The source gateway station sends second indication information to the terminal device through the satellite.

Correspondingly, the terminal device receives the second indication information that is from the source gateway station and that is forwarded by the satellite, where the second indication information indicates a transmission resource for transmitting the uplink reference signal, and the uplink reference signal is used to detect first channel quality.

It should be noted that step 201 and step 202 are not subject to a strict sequence.

203: The terminal device determines whether to enable a function of triggering gateway station switching. If the terminal device enables the function of triggering gateway station switching, step 204 is performed. If the terminal device does not enable the function of triggering gateway station switching, step 212 is performed.

For example, the terminal device determines whether the activation instruction of DGS trigger=1 is received. If the activation instruction is received, it indicates that the terminal device enables the function of triggering gateway station switching. If the activation instruction of DGS trigger=1 is not received, it indicates that the terminal device does not need to detect the quality of the downlink signal.

204: The terminal device determines whether the quality of the downlink signal is lower than the first threshold. If the quality of the downlink signal is lower than the first threshold, step 205 is performed. If the quality of the downlink signal is equal to or higher than the first threshold, step 203 is performed.

For example, the quality of the downlink signal may be a signal to noise power ratio (SNR), a bit energy to noise power spectral density ratio (Eb/NO), a reference signal received power (RSRP), a channel quality indicator (CQI), a signal to interference plus noise power ratio (SINR), a reference signal received quality (RSRQ), or decoding performance (such as a packet loss rate) that is obtained based on a downlink reference signal or a downlink data signal. The downlink reference signal may be a demodulation reference signal (DMRS), a phase tracking reference signal (PTRS), a channel state information reference signal (CSI-RS), or the like.

205: The terminal device sends the uplink reference signal to the satellite.

The uplink reference signal may be an uplink sounding reference signal (SRS), a DMRS, a phase tracking reference signal (PTRS), or the like.

Optionally, if the source gateway station preconfigures a quantity of sending times N, the terminal device sends the uplink reference signal to the satellite for N times. Then, the activation instruction is reset to 0, that is, DGS trigger=0. Alternatively, if the source gateway station preconfigures the interval T, after detecting that the quality of the downlink signal is lower than the first threshold and sending the uplink reference signal for N times, the terminal device detects the quality of the downlink signal again after a period of time T (T is greater than 0), and determines based on a result obtained through the second detection, whether to send the uplink reference signal. This solution can avoid an increase in power consumption caused when the terminal device keeps sending the uplink reference signal.

206: The satellite forwards the uplink reference signal to the source gateway station.

207: The satellite forwards the uplink reference signal to a target gateway station.

It should be noted that step 206 and step 207 are not subject to a strict sequence.

208: The source gateway station determines the first channel quality by using the uplink reference signal.

209: The target gateway station determines second channel quality by using the uplink reference signal.

210: The target gateway station sends the second channel quality to the source gateway station.

211: The source gateway station determines, based on the first channel quality and the second channel quality, whether to switch the terminal device to the target gateway station.

For example, if the first channel quality is higher than or equal to a second threshold, it indicates that a link from the terminal device to the source gateway station through the satellite is normal, and gateway station switching or satellite switching is not performed. If the first channel quality is lower than the second threshold, it indicates that there is a quality problem in the link from the terminal device to the source gateway station through the satellite, and satellite switching or gateway station switching needs to be performed. Further, if the second channel quality is higher than or equal to the second threshold, the terminal device is switched from the source gateway station to the target gateway station, or each terminal device in a cell or beam coverage area in which the terminal device is located is switched from the source gateway station to the target gateway station. If the second channel quality is lower than the second threshold, satellite switching is performed on the terminal device, or satellite switching is performed on a terminal device in the cell or the beam coverage area in which the terminal device is located.

212: The terminal device does not detect the quality of the downlink signal.

Figure 5:
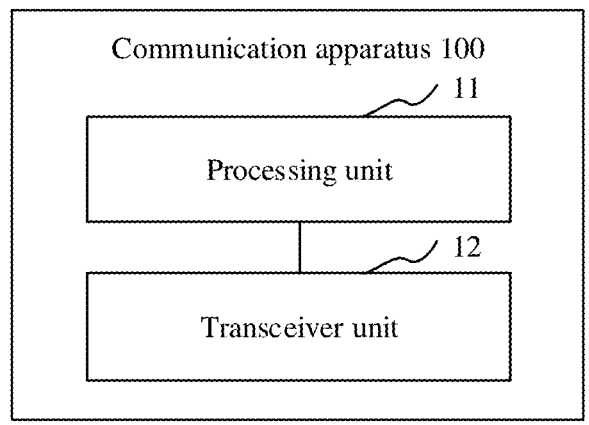
FIG. 5 is a schematic diagram of a structure of a communication apparatus according to an embodiment.

FIG. 5 is a schematic diagram of a structure of a communication apparatus according to an embodiment. The communication apparatus in this embodiment may be a terminal device or may be a chip used in a terminal device. The communication apparatus may be configured to perform functions of the terminal device in the foregoing embodiments. As shown in FIG. 5, a communication apparatus 100 may include:

a processing unit 11, configured to detect that quality of a downlink signal that is from a source gateway station and that is forwarded by a satellite is lower than a first threshold; and a transceiver unit 12, configured to send first indication information to the source gateway station, where the first indication information indicates that first channel quality is lower than the first threshold, and the first channel quality represents quality of a link from a terminal device to the source gateway station through the satellite.

After sending the first indication information to the source gateway station, the transceiver unit 12 may be further configured to send an uplink reference signal to the satellite. The uplink reference signal is used by the source gateway station to detect the first channel quality and used by a target gateway station to detect second channel quality. The second channel quality represents quality of a link from the terminal device to the target gateway station through the satellite.

The first indication information may be an uplink reference signal. The uplink reference signal is used by the source gateway station to detect the first channel quality and used by a target gateway station to detect second channel quality.

The second channel quality represents quality of a link from the terminal device to the target gateway station through the satellite.

Before the processing unit 11 detects that the quality of the downlink signal that is from the source gateway station and that is forwarded by the satellite is lower than the first threshold, the transceiver unit 12 may be further configured to receive at least one of the first threshold, an activation instruction, a target quantity N of times, and an interval T that are from the source gateway station and forwarded by the satellite. The activation instruction instructs the terminal device to send the uplink reference signal when the quality of the downlink signal is lower than the first threshold. The target quantity N of times indicates a quantity of times that the terminal device sends the uplink reference signal. The interval T indicates duration from sending the uplink reference signal by the terminal device for N times to detecting the quality of the downlink signal again, where N is an integer greater than or equal to 1.

At least one of the first threshold, the activation instruction, the target quantity N of times, and the interval T may be carried in broadcast information.

Alternatively, at least one of the first threshold, the activation instruction, the target quantity N, and the interval T is carried in connected mode information, where the connected mode information includes at least one of RRC information, downlink control information (DCI), group DCI, a media access control (MAC) element, and a timing advance command (TAC).

Alternatively, at least one of the first threshold, the activation instruction, the target quantity N of times, and the interval T is sent through a physical downlink shared data channel.

The transceiver unit 12 may be further configured to receive second indication information sent by the source gateway station through the satellite, where the second indication information indicates a transmission resource of the uplink reference signal.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords.

The communication apparatus provided in this embodiment may perform actions of the terminal device in the foregoing method embodiments. An implementation principle and an effect thereof may be similar. Details are not described herein again.

Figure 6:
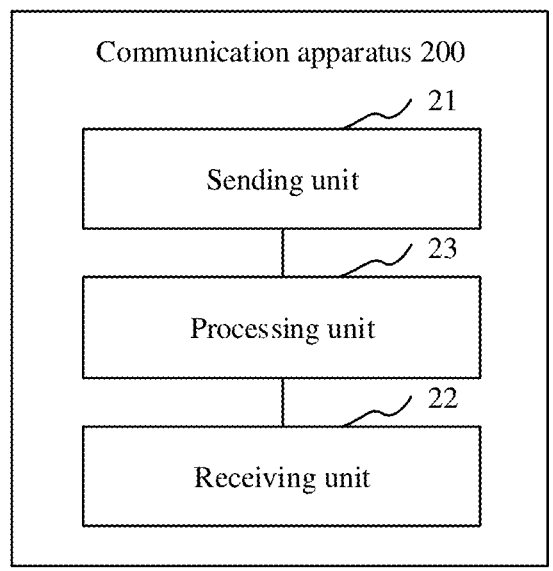
FIG. 6 is a schematic diagram of a structure of another communication apparatus according to an embodiment.

FIG. 6 is a schematic structural diagram of another communication apparatus according to an embodiment. The communication apparatus in this embodiment may be a source gateway station or may be a chip used in a source gateway station. The communication apparatus may be configured to perform functions of the source gateway station in the foregoing embodiments. As shown in FIG. 6, a communication apparatus 200 may include:

a sending unit 21, configured to send third indication information to a target gateway station, where the third indication information indicates the target gateway station to feed back second channel quality to a source gateway station, and the second channel quality represents quality of a link from a terminal device to the target gateway station through a satellite;

a receiving unit 22, configured to receive the second channel quality from the target gateway station; and a processing unit 23, configured to determine, based on the second channel quality and first channel quality, whether to switch the terminal device to the target gateway station, where the first channel quality represents quality of a link from the terminal device to the source gateway station through the satellite.

Before the sending unit 21 sends the third indication information to the target gateway station, the processing unit 23 may be further configured to determine that the first channel quality is lower than a first threshold.

Before the sending unit 21 sends the third indication information to the target gateway station, the receiving unit 22 may be further configured to receive first indication information that is from the terminal device and that is forwarded by the satellite, where the first indication information indicates that channel quality of the link from the terminal device to the source gateway station through the satellite is lower than a first threshold.

When the first indication information is an uplink reference signal of a preset structure, the uplink reference signal may be further used by the source gateway station to detect the first channel quality and the target gateway station to detect the second channel quality.

Before the receiving unit 22 receives the first indication information that is from the terminal device and that is forwarded by the satellite, the sending unit 21 may be further configured to send at least one of a first threshold, an activation instruction, a target quantity N of times, and an interval T to the terminal device through the satellite. The activation instruction instructs the terminal device to send the uplink reference signal when the quality of the downlink signal is lower than the first threshold. The target quantity N of times indicates a quantity of times that the terminal device sends the uplink reference signal. The interval T indicates duration from sending the uplink reference signal by the terminal device for N times to detecting the quality of the downlink signal again, where N is an integer greater than or equal to 1.

At least one of the first threshold, the activation instruction, the target quantity N of times, and the interval T may be carried in broadcast information.

Alternatively, at least one of the first threshold, the activation instruction, the target quantity N, and the interval T is carried in connected mode information, where the connected mode information includes at least one of RRC information, downlink control information (DCI), group DCI, a media access control (MAC) element, and a timing advance command (TAC).

Alternatively, at least one of the first threshold, the activation instruction, the target quantity N of times, and the interval T is sent through a physical downlink shared data channel.

The processing unit 23 may be configured to switch the terminal device from the source gateway station to the target gateway station when the first channel quality is lower than a second threshold and the second channel quality is higher than or equal to the second threshold. Alternatively, the processing unit 23 is configured to switch each terminal device in a target area from the source gateway station to the target gateway station when the first channel quality is lower than a second threshold and the second channel quality is higher than or equal to the second threshold. The target area is a cell or a beam coverage area in which the terminal device is located. The cell includes at least one beam coverage area. The cell is included in a coverage area of the satellite.

The processing unit 23 may be configured to perform satellite switching on the terminal device when the first channel quality is lower than a second threshold and the second channel quality is lower than the second threshold. Alternatively, the processing unit 23 is configured to perform satellite switching on each terminal device in a target area when the first channel quality is lower than the second threshold and the second channel quality is lower than the second threshold. The target area is a cell or a beam coverage area in which the terminal device is located. The cell includes at least one beam coverage area. The cell is included in a coverage area of the satellite.

Before the receiving unit 22 receives the second channel quality from the target gateway station, the sending unit 21 may be further configured to send second indication information to the terminal device through the satellite, where the second indication information indicates a transmission resource for transmitting the uplink reference signal, and the uplink reference signal is used to detect the first channel quality.

The third indication information may further indicate a transmission resource on which the uplink reference signal is located, and the uplink reference signal is used to detect the first channel quality.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords.

The sending unit 21 may be further configured to send fourth indication information to the satellite, where the fourth indication information indicates the satellite to send the uplink reference signal to the source gateway station and the target gateway station.

The communication apparatus provided in this embodiment may perform actions of the source gateway station in the foregoing embodiments. An implementation principle and an effect thereof may be similar. Details are not described herein again.

Figure 7:
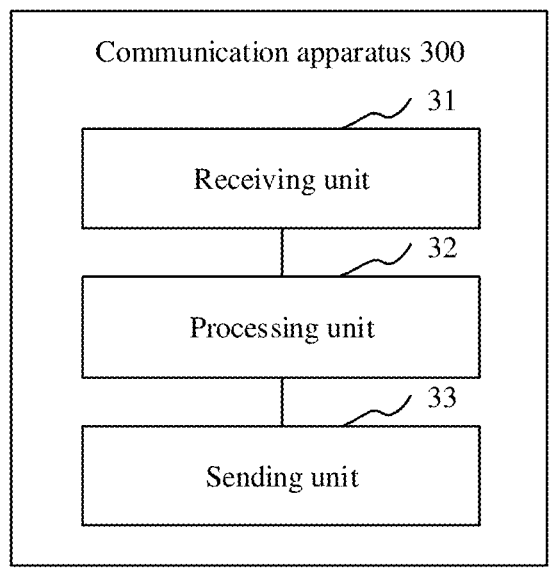
FIG. 7 is a schematic diagram of a structure of still another communication apparatus according to an embodiment.

FIG. 7 is a schematic diagram of a structure of still another communication apparatus according to an embodiment. The communication apparatus in this embodiment may be a target gateway station or may be a chip used in a target gateway station. The communication apparatus may be configured to perform functions of the target gateway station in the foregoing embodiments. As shown in FIG. 7, a communication apparatus 300 may include:

a receiving unit 31, configured to receive third indication information sent by a source gateway station, where the third indication information indicates a target gateway station to feed back second channel quality to the source gateway station, and the second channel quality represents quality of a link from a terminal device to the target gateway station through a satellite;

a processing unit 32, configured to determine the second channel quality; and a sending unit 33, configured to send the second channel quality to the source gateway station.

The receiving unit 31 may be further configured to receive an uplink reference signal that is from the terminal device and that is forwarded by the satellite. The processing unit 32 is configured to determine the second channel quality based on the uplink reference signal.

The third indication information may further indicate a transmission resource on which the uplink reference signal is located, and the uplink reference signal may be used to detect the first channel quality.

Transmission resources of different terminal devices in a same beam coverage area or cell may be mutual transmission resources that have different time-frequency domain resources and a same codeword or different codewords. Alternatively, the transmission resources of the different terminal devices in the same beam coverage area or cell are mutual transmission resources that have a same time-frequency domain resource and different codewords.

The communication apparatus provided in this embodiment may perform actions of the target gateway station in the foregoing embodiments. An implementation principle and an effect thereof may be similar. Details are not described herein again.

It should be noted that, it should be understood that the receiving unit may be a receiver in actual implementation, the sending unit may be a transmitter in actual implementation, and the transceiver unit may be a transceiver. The processing unit may be implemented in a form of software invoked by a processing element or may be implemented in a form of hardware. For example, the processing unit may be a separately disposed processing element or may be integrated into a chip of the foregoing apparatus for implementation. In addition, the processing unit may alternatively be stored in a memory of the foregoing apparatus in a form of program code and is invoked by a processing element of the foregoing apparatus to perform a function of the processing unit. In addition, all or some of the units may be integrated, or may be implemented independently. The processing element herein may be an integrated circuit and has a signal processing capability. In an implementation process, steps of the foregoing method or the foregoing units may be implemented by using a hardware integrated logical circuit in the processing element, or by using instructions in a form of software.

For example, the foregoing units may be one or more integrated circuits configured to implement the foregoing method, for example, one or more application-specific integrated circuits (ASICs), one or more microprocessors (DSPs), or one or more field programmable gate arrays (FPGAs). For another example, when one of the units is implemented in a form of scheduling program code by a processing element, the processing element may be a general-purpose processor, for example, a central processing unit (CPU) or another processor that can invoke the program code. For another example, the units may be integrated together and implemented in a form of a system-on-a-chip (SOC).

Figure 8:
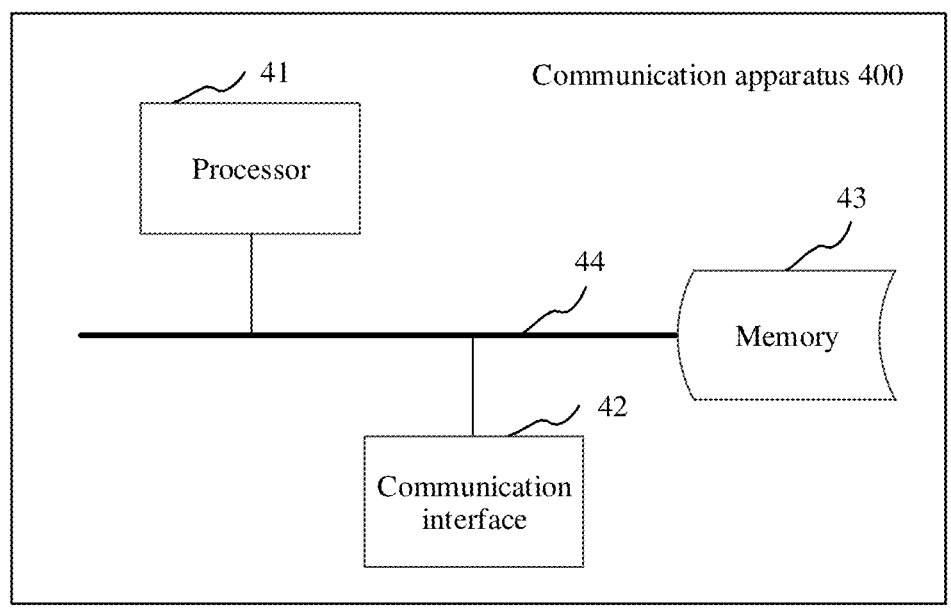
FIG. 8 is a schematic diagram of a structure of yet another communication apparatus according to an embodiment.

FIG. 8 is a schematic diagram of a structure of yet another communication apparatus according to an embodiment. As shown in FIG. 8, a communication apparatus 400 includes:

a processor 41 and a memory 42.

The memory 42 stores computer-executable instructions.

The processor 41 executes the computer-executable instructions stored in the memory 42, so that the processor 41 performs the foregoing gateway station switching method performed by the terminal device, or the processor 41 performs the foregoing gateway station switching method performed by the source gateway station, or the processor 41 performs the foregoing gateway station switching method performed by the target gateway station.

For an implementation process of the processor 41, refer to the foregoing method embodiments. An implementation principle and an effect of the processor 41 are similar to those of the method embodiments. Details are not described herein again in this embodiment.

Optionally, the communication apparatus 400 further includes a communication interface 43. The processor 41, the memory 42, and the communication interface 43 may be connected through a bus 44.

In the foregoing implementation of the communication apparatus, the memory and the processor are directly or indirectly electrically connected to each other, to implement data transmission or exchange. In other words, the memory and the processor may be connected through an interface or may be integrated together. For example, these elements may be electrically connected to each other by using one or more communication buses or signal lines, for example, may be connected by using a bus. The memory stores computer executable instructions for implementing a data access control method, including at least one software function module that can be stored in the memory in a form of software or firmware. The processor executes various function applications and data processing by running the software program and module stored in the memory.

The memory may be, but is not limited to, a random access memory (RAM), a read-only memory (ROM), a programmable read-only memory (PROM), an erasable read-only memory (EPROM), an electrically erasable read-only memory (EEPROM), and the like. The memory is configured to store the program, and the processor executes the program after receiving an execution instruction. Further, the software program and module in the memory may further include an operating system. The operating system may include various software components and/or drivers used for system task management (for example, memory management, storage device control, and power management), and may communicate with various hardware or software components to provide a running environment of other software components.

The processor may be an integrated circuit chip and has a signal processing capability. The foregoing processor may be a general-purpose processor, including a central processing unit (CPU), a network processor (NP), or the like. The processor may implement or perform the methods, steps, and logical block diagrams in the embodiments. The general-purpose processor may be a microprocessor, or the processor may be any conventional processor or the like.

Based on the foregoing description, the embodiments may further provide a chip, including a logic circuit and an input interface. The input interface is configured to obtain to-be-processed data. The logic circuit is configured to perform the solution on a terminal device side in the foregoing method embodiments on the to-be-processed data, to obtain processed data.

Optionally, the chip may further include an output interface, where the output interface is configured to output processed data.

When the logic circuit executes the solution on the terminal device side, the to-be-processed data obtained by the input interface includes a downlink signal, second indication information, and the like. The processed data output by the output interface includes first indication information, an uplink reference signal, and the like.

The embodiments may further provide a chip, including a logic circuit and an output interface. The logic circuit is configured to perform the solution on a source gateway station side in the foregoing method embodiments on to-be-processed data, to obtain processed data. The output interface is configured to output the processed data.

Optionally, the chip further includes an input interface, and the input interface is configured to obtain the to-be-processed data.

When the logic circuit executes the solution of the source gateway station side, the to-be-processed data obtained by the input interface includes an uplink data signal, an uplink reference signal, and the like. The processed data output by the output interface includes second indication information, third indication information, and the like.

The embodiments may further provide a chip, including a logic circuit and an output interface. The logic circuit is configured to perform the solution on a target gateway station side in the foregoing method embodiments on to-be-processed data, to obtain processed data. The output interface is configured to output the processed data.

Optionally, the chip further includes an input interface, and the input interface is configured to obtain the to-be-processed data.

When the logic circuit executes the solution of the target gateway station side, the to-be-processed data obtained by the input interface includes an uplink reference signal and the like. The processed data output by the output interface includes second channel quality and the like.

The embodiments may further provide a non-transitory computer-readable storage medium. The non-transitory computer-readable storage medium may be configured to store a program, and when the program is executed by a processor, the program is used to perform the solution on a terminal device side in the foregoing embodiments.

The embodiments may further provides a non-transitory computer-readable storage medium. The non-transitory computer-readable storage medium may be configured to store a program, and when the program is executed by a processor, the program is used to perform the solution on a source gateway station side in the foregoing embodiments.

The embodiments may further provides a non-transitory computer-readable storage medium. The non-transitory computer-readable storage medium may be configured to store a program, and when the program is executed by a processor, the program is used to perform the solution on a target gateway station side in the foregoing embodiments.

An embodiment may further provide a computer program product. When the computer program product runs on a communication apparatus, the communication apparatus performs the solution on a terminal device side in the foregoing embodiments, or the communication apparatus performs the solution of a source gateway station in the foregoing embodiments, or the communication apparatus performs the solution of a target gateway station in the foregoing embodiments.

A person of ordinary skill in the art should understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc. A medium type is not limited in the embodiments.

What is claimed is:

1. A gateway station switching method, comprising:
   detecting, by a terminal device, that quality of a downlink signal that is from a source gateway station and that is forwarded by a satellite is lower than a first threshold; and sending, by the terminal device, first indication information to the source gateway station, wherein the first indication information indicates that first channel quality is lower than the first threshold, the first channel quality represents a quality of a link from the terminal device to the source gateway station through the satellite, the first indication information is an uplink reference signal used by the source gateway station to detect the first channel quality and by a target gateway station to detect second channel quality, and the second channel quality represents a quality of a link from the terminal device to the target gateway station through the satellite.

2. The gateway station switching method according to claim 1, wherein after sending, by the terminal device, the first indication information to the source gateway station, further comprising:
sending, by the terminal device, the uplink reference signal to the satellite, wherein.

3. The gateway station switching method according to claim 2, further comprising:
receiving, by the terminal device, second indication information sent by the source gateway station through the satellite, wherein the second indication information indicates a transmission resource of the uplink reference signal.

4. A gateway station switching method, comprising:
sending, by a source gateway station, third indication information to a target gateway station, wherein the third indication information indicates the target gateway station to feed back a second channel quality to the source gateway station, and the second channel quality represents quality of a link from a terminal device to the target gateway station through a satellite;
receiving, by the source gateway station, the second channel quality from the target gateway station; and
determining, by the source gateway station based on the second channel quality and a first channel quality, whether to switch the terminal device to the target gateway station, wherein the first channel quality represents quality of a link from the terminal device to the source gateway station through the satellite, and first indication information is an uplink reference signal used by the source gateway station to detect the first channel quality and by a target gateway station to detect second channel quality.

5. The gateway station switching method according to claim 4, wherein before sending, by the source gateway station, the third indication information to the target gateway station, further comprising:
determining, by the source gateway station, that the first channel quality is lower than a first threshold.

6. The gateway station switching method according to claim 4, wherein before sending, by the source gateway station, third indication information to the target gateway station, further comprising:
receiving, by the source gateway station, first indication information that is from the terminal device and that is forwarded by the satellite, wherein the first indication information indicates that channel quality of the link from the terminal device to the source gateway station through the satellite is lower than a first threshold.

7. The gateway station switching method according to claim 6, wherein when the first indication information is an uplink reference signal of a preset structure, the uplink reference signal is further used by the source gateway station to detect the first channel quality and the target gateway station to detect the second channel quality.

8. The gateway station switching method according to claim 4, wherein determining, by the source gateway station based on the second channel quality and the first channel quality, whether to switch the terminal device to the target gateway station further comprises:
switching, by the source gateway station, the terminal device from the source gateway station to the target gateway station when the first channel quality is lower than a second threshold and the second channel quality is higher than or equal to the second threshold; or
switching, by the source gateway station, each terminal device in a target area from the source gateway station to the target gateway station when the first channel quality is lower than a second threshold and the second channel quality is higher than or equal to the second threshold, wherein the target area is a cell or a beam coverage area in which the terminal device is located, the cell comprises at least one beam coverage area, and the cell is comprised in a coverage area of the satellite.

9. The gateway station switching method according to claim 4, further comprising:
performing, by the source gateway station, satellite switching on the terminal device when the first channel quality is lower than a second threshold and the second channel quality is lower than the second threshold; or
performing, by the source gateway station, satellite switching on each terminal device in a target area when the first channel quality is lower than the second threshold and the second channel quality is lower than the second threshold, wherein the target area is a cell or a beam coverage area in which the terminal device is located, the cell comprises at least one beam coverage area, and the cell is comprised in a coverage area of the satellite.

10. The gateway station switching method according to claim 4, wherein before receiving, by the source gateway station, the second channel quality from the target gateway station, further comprising:
sending, by the source gateway station, the second indication information to the terminal device through the satellite, wherein the second indication information indicates a transmission resource for transmitting the uplink reference signal, and the uplink reference signal is used to detect the first channel quality.

11. The gateway station switching method according to claim 4, wherein the third indication information further indicates a transmission resource on which the uplink reference signal is located, and the uplink reference signal is used to detect the first channel quality.

12. A gateway station switching method, comprising:
receiving, by a target gateway station, third indication information sent by a source gateway station, wherein the third indication information indicates the target gateway station to feed back second channel quality to the source gateway station, and the second channel quality represents quality of a link from a terminal device to the target gateway station through a satellite;
determining, by the target gateway station, the second channel quality; and
sending, by the target gateway station, the second channel quality to the source gateway station, and first indication information is an uplink reference signal used by the source gateway station to detect the first channel quality and by a target gateway station to detect second channel quality.

13. The gateway station switching method according to claim 12, wherein determining, by the target gateway station, the second channel quality further comprises:
- receiving, by the target gateway station, an uplink reference signal that is from the terminal device and that is forwarded by the satellite; and
- determining, by the target gateway station, the second channel quality based on the uplink reference signal.

14. The gateway station switching method according to claim 12, wherein the third indication information further indicates a transmission resource on which the uplink reference signal is located, and the uplink reference signal is used to detect first channel quality.

\* \* \* \* \*